US006985914B2

(12) United States Patent
Venkatesh et al.

(10) Patent No.: US 6,985,914 B2
(45) Date of Patent: Jan. 10, 2006

(54) CLUSTER META FILE SYSTEM OF FILE SYSTEM CELLS MANAGED BY RESPECTIVE DATA MOVERS OF A NETWORK FILE SERVER

(75) Inventors: Dinesh Venkatesh, Westford, MA (US); Uday K. Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 576 days.

(21) Appl. No.: 10/079,090

(22) Filed: Feb. 20, 2002

(65) Prior Publication Data

US 2003/0158836 A1    Aug. 21, 2003

(51) Int. Cl.
    *G06F 12/00*    (2006.01)
(52) U.S. Cl. .......................................... 707/200; 707/1
(58) Field of Classification Search .................... 707/1, 707/10, 100, 200, 204–205
    See application file for complete search history.

(56) References Cited

U.S. PATENT DOCUMENTS

| 4,577,272 | A | 3/1986 | Ballew et al. ............... 364/200 |
| 5,175,852 | A | 12/1992 | Johnson et al. ............. 395/600 |
| 5,367,671 | A | 11/1994 | Feigenbaum et al. .......... 707/1 |
| 5,367,698 | A | 11/1994 | Webber et al. .............. 395/800 |
| 5,495,607 | A | 2/1996 | Pisello et al. ................. 707/10 |
| 5,537,588 | A | 7/1996 | Engelmann et al. ......... 395/600 |
| 5,544,313 | A | 8/1996 | Shachnai et al. ...... 395/200.01 |
| 5,566,328 | A | 10/1996 | Eastep ......................... 707/102 |
| 5,590,320 | A | 12/1996 | Maxey ......................... 395/619 |
| 5,640,501 | A | 6/1997 | Turpin ........................ 715/507 |
| 5,644,736 | A | 7/1997 | Healy et al. ................. 345/784 |
| 5,737,747 | A | 4/1998 | Vishlitzky et al. .......... 711/118 |
| 5,740,422 | A | 4/1998 | Foltz et al. ................. 395/609 |
| 5,754,848 | A | 5/1998 | Hanes ......................... 707/200 |
| 5,774,660 | A | 6/1998 | Brendel et al. ........ 395/200.31 |
| 5,794,232 | A | * 8/1998 | Mahlum et al. ................ 707/3 |
| 5,819,296 | A | 10/1998 | Anderson et al. ........... 707/204 |
| 5,884,298 | A | 3/1999 | Smith et al. .................... 707/2 |
| 5,893,140 | A | 4/1999 | Vahalia et al. .............. 711/118 |
| 5,944,789 | A | 8/1999 | Tzelnic et al. .............. 709/214 |
| 5,987,621 | A | 11/1999 | Duso et al. ..................... 714/4 |
| 5,991,771 | A | 11/1999 | Falls et al. .................. 707/202 |
| 5,991,793 | A | 11/1999 | Mukaida et al. ............ 709/104 |

(Continued)

OTHER PUBLICATIONS

Computer Dictionary, Third Edition, 1997, Microsoft Press, Microsoft Corporation, Redmond, WA 98052, pp. 231-232.

(Continued)

*Primary Examiner*—Mohammad Ali
*Assistant Examiner*—Sathyanarayan Pannala
(74) *Attorney, Agent, or Firm*—Richard Auchterlonie; Novak Druce & Quigg, LLP

(57) ABSTRACT

File system cells are linked together to form a meta file system that appears to a user or application program to be a single file system. The meta file system permits concurrent access by multiple processors in a file server wherein each file system cell is managed by a respective one of the processors. The file server responds to a directory access request by returning a file handle containing a file system cell ID and a pointer to a file in the file system cell. The file server responds to a subsequent file access request including the file handle by extracting the file system cell ID and the pointer to the file, searching a routing table for an entry having a file system cell ID matching the file system cell ID extracted from the file handle, and routing the request to the processor managing the file system cell.

18 Claims, 14 Drawing Sheets

U.S. PATENT DOCUMENTS

| | | | |
|---|---|---|---|
| 6,003,047 A | 12/1999 | Osmond et al. | 707/513 |
| 6,044,444 A | 3/2000 | Ofek | 711/162 |
| 6,192,408 B1 | 2/2001 | Vahalia et al. | 709/229 |
| 6,230,200 B1 | 5/2001 | Forecast et al. | 709/226 |
| 6,269,431 B1 | 7/2001 | Dunham | 711/162 |
| 6,275,953 B1 | 8/2001 | Vahalia et al. | 714/11 |
| 6,298,390 B1 | 10/2001 | Matena et al. | 709/315 |
| 6,324,581 B1 | 11/2001 | Xu et al. | 709/229 |
| 6,345,266 B1 * | 2/2002 | Ganguly et al. | 707/1 |
| 6,353,878 B1 | 3/2002 | Dunham | 711/162 |
| 6,421,711 B1 | 7/2002 | Blumenau et al. | 709/213 |
| 6,448,985 B1 | 9/2002 | McNally | 345/784 |
| 6,453,354 B1 | 9/2002 | Jiang et al. | 709/229 |
| 6,499,039 B1 | 12/2002 | Venkatesh et al. | 707/204 |
| 6,542,967 B1 * | 4/2003 | Major | 711/134 |
| 6,571,259 B1 | 5/2003 | Zheng et al. | 707/205 |
| 6,625,750 B1 | 9/2003 | Duso et al. | 714/11 |
| 6,643,654 B1 * | 11/2003 | Patel et al. | 707/10 |
| 6,721,758 B1 * | 4/2004 | Jex et al. | 717/165 |
| 2002/0103779 A1 | 8/2002 | Ricart et al. | 707/1 |
| 2002/0138502 A1 | 9/2002 | Gupta | 707/200 |

OTHER PUBLICATIONS

File System, Free Online Dictionary of Computing, Editor Denis Howe, Imperial College Department of Computing, London, England, SW7 2AZ, wombat.doc.ic.ac.uk, Oct. 14, 2003.

Mount(8)—Linux man page, die.net, Jan. 7, 2004, 15 pages.

Glen Fowler, AST Manual, ast_mount(1), 1998-2003, AT&T Corp., akpublic.research.att.com, 2 pages.

Matloff, Norman, File Systems in Unix, Department of Computer Science, University of California at Davis, heather.cs.ucdavis.edu, Oct. 19, 1998, 5 pages.

Uresh Vahalia, *UNIX internals: the new frontiers, Chapter 9, "File System Implementations,"* Prentice-Hall, Inc., Upper Saddle River, New Jersey, 1996, pp. 261-289.

Peter Norton and Richard Wilton, *The New Peter Norton Programmer's Guide To The IBM PC & PS/2*, Chapter 5 Disk Basics, Microsoft Press, Redmond, Washington, 1988, pp. 99-123.

Brian W. Kernighan and Rob Pike, *The UNIX Programming Environment*, Chapter 2, The File System, Prentice-Hall, Inc., Englewood Cliffs, NJ 07632, pp. 41-70, 122-124.

Philip Trautman and Jim Mostek, *Scalability and Performance in Modern File Systems*, http://oss.sgi.com/projects/xfs/papers/xfs_white/xfs_white.html, published at least as early as Oct. 28, 2000, pp. 1-21.

P. Venkat Rangan and Harrick M. Vin, *Designing File Systems for Digital Video and Audio*, Multimedia Laboratory, Department of Computer Science & Engineering, University of California, San Diego, La Jolla, CA, pp. 81-94.

David P. Anderson, Yoshitomo Osawa, and Ramesh Govindan, *A File System for Continuous Media*, ACM Transactions on Computer Ssystems, vol. 10, No. 4, pp. 311-336.

"Filesystem *Manager*—VxFS" http://www.fujitsu-computers.com/Servers/software/ds-mgw-12.html, published at least as early as Oct. 28, 2000, 2 pages.

"VERTIAS Volume Manager" http://www.sun.com/stor.../volumemgr.html; $sessionid$QEOQTDQAAC2QHAMTA1FU5Y, published at least as early as Oct. 28, 2000, 3 pages.

"VERTIAS NetBackup and Storage Migrator" http://www.sun.com/stora.../netbackup.html; $sessionid$QEOQTDQAAC2QHAMTA1FU5Y, published at least as early as Oct. 28, 2000, 5 pages.

"VERTIAS File System, System Administrator's Guide," Release 3.2, VERITAS Software Corporation, Introduction, Index, Performance and Tuning (Chapter 5), fsadm_vxfs (1M)—resize or reorganize a VERITAS File System (http://uw7doc.sco.com/ODM_FSadmin/fssag-1.html, fssag-13.html, fssag-8.html, and http://uw7doc.sco.com/cgi-bin/man/man?fsadm_vxfs+1M) published at least as early as Oct. 28, 2000, 31 pages total.

Request for Comments ("RFC") 1094, Sun Microsystems, Inc., *"NFS: Network File Systems Protocol Specification,"* Mar. 1989 (23 pages).

Paul L. Leach and Dilip C. Narik, *"A Common Internet File System,"* Microsoft Corporation, Dec. 19, 1997 (121 pages).

* cited by examiner

CLUSTER META FILE SYSTEM OF FILE SYSTEM CELLS MANAGED BY RESPECTIVE DATA MOVERS OF A NETWORK FILE SERVER

BACKGROUND OF THE INVENTION

1. Field of the Invention

The present invention relates generally to data storage, and specifically to file systems.

2. Description of Related Art

Files are typically stored on disk in a hierarchical data structure called a file system. The file system includes a root directory and objects such as files, links, and subdirectories. The hierarchical arrangement was popularized in the UNIX operating system, and was also adopted in the Microsoft MS-DOS operating system for personal computers. The hierarchical arrangement survives today in various UNIX-based file systems, the Microsoft Windows operating system, and many other operating systems.

In a network environment, a network file server typically stores multiple file systems. A network client may access a specified file system using standard protocols such as the Network File System ("NFS") Protocol and the Common Internet File System ("CIFS") Protocol. NFS is described in Request for Comments ("RFC") 1094, Sun Microsystems, Inc., "NFS: Network File Systems Protocol Specification," March 1989, incorporated herein by reference. The CIFS protocol is described in Paul L. Leach and Dilip C. Narik, "A Common Internet File System," Microsoft Corporation, Dec. 19, 1997, incorporated herein by reference.

A network storage system typically includes an array of disk drives and a storage controller for accessing the disk drives in response to client requests for file access. The storage controller is programmed with a number of software layers including a file system layer for mapping file names to logical storage locations, and a storage layer for cache management and mapping of logical storage locations to physical storage locations on disk. In a very high capacity system, the storage controller may have multiple processing units, typically dedicated to file system layer functions or storage layer functions. For example, the file system layer functions may be performed by multiple commodity computers, and the storage layer functions may be performed by a cached disk array, as described in Vahalia et al., U.S. Pat. No. 5,893,140, issued Apr. 6, 1999, and entitled "File Server Having A File System Cache And Protocol For Truly Safe Asynchronous Writes," incorporated herein by reference.

One problem with the use of multiple processing units for performing file system layer functions is conflict between concurrent file access operations. For example, data consistency problems may arise if concurrent access to a read/write file is permitted through more than one processing unit. One solution to this problem, as described in the Vahalia et al. U.S. Pat. No. 5,893,140, is to store locking information in the data storage of the network file server. Another solution to the problem, as described in Vahalia et al. U.S. Pat. No. 6,192,408 issued Feb. 20, 2001, incorporated herein by reference, is to assign exclusive access rights for each read/write file system to a respective one of the processing units. When a processing unit receives a client request for access to a read/write file and finds that another processing unit has exclusive access rights to the file system including the read/write file, it forwards the client request to the processing unit having exclusive access rights to the file system, and the processing unit having exclusive rights to the file system accesses the read/write file on behalf of the client. Still another solution to the problem, as described in Xu et al. U.S. Pat. No. 6,324,581 issued Nov. 27, 2001, is to assign exclusive metadata management rights for each read/write file system to a respective one of the processing units. When a processing unit receives a client request for access to a read/write file and finds that another processing unit has exclusive metadata management rights to the file system including the read/write file, it forwards a metadata request to the processing unit having exclusive metadata management rights to the file system, and the processing unit having exclusive metadata management rights responds by placing a lock on the read/write file and returning metadata of the file. The processing unit that received the client request uses the metadata to formulate a data access command for accessing the file data in the file system over a bypass data path that bypasses the processing unit having exclusive metadata management rights to the file system.

Although it is preferred to give a respective one of the processing units exclusive rights to each read/write file system for preventing data consistency problems, there could be a poor match between the number and size of the file systems stored in the network file server and the number of processing units that may be assigned exclusive access or management rights to the file systems. In other words, there is a need for an efficient way of configuring exclusive rights of processing units in the network file server to the file systems stored in the network file server.

SUMMARY OF THE INVENTION

In accordance with one aspect, the invention provides a method of accessing an object in a meta file system stored in a network file server in a data network. The meta file system includes a plurality of file system cells. The method includes a network client sending a directory lookup request for the object to the network file server. The network file server receives the directory lookup request, and in response, performs a directory lookup for the object, and returns to the network client a file handle for the object. The file handle includes an identifier of a file system cell including the object, and a pointer to the object in the file system cell. The network client receives the file handle for the object, and sends to the network file server a request for access to the object. The request for access to the object includes the file handle for the object. The network file server receives the request for access to the object, and in response, the network file server extracts the file system cell identifier and the object pointer from the file handle included in the request for access, and uses the file system cell identifier to find the file system cell that includes the object, and uses the object pointer to find the object in the file system cell.

In accordance with another aspect, the invention provides a method of accessing an object in a meta file system stored in a network file server. The network file server includes a cached disk array and a plurality of data mover computers for moving data between the cached disk array and a data network. The meta file system includes a plurality of file system cells. Each of the file system cells has a respective one of the data mover computers assigned exclusive management of meta data of the file system cell. The method includes storing a routing table in each of the plurality of data mover computers. Each of the plurality of routing tables including an entry for each file system cell. Each entry includes a respective file system cell identifier and associates the respective file system cell identifier with a pointer to the respective one of the data mover computers assigned exclusive management of metadata of the file system cell identified by the respective file system cell identifier. In response to the network file server receiving a request from the network for a file handle for a file, the network file server produces a file handle for the file. The file handle contains a file identifier obtained from the file system cell and a file system identifier for the file system cell containing the file. At least one of the data mover computers receives a subsequent request from the network for access to the file, and the request for access to the file includes the file handle. At least one of the data movers responds to the request for access to the file by accessing the routing table to obtain the pointer to the respective one of the data movers assigned exclusive management of metadata of the file system cell containing the file in order to obtain management of metadata of the file system cell containing the file in order to access to the file.

In accordance with yet another aspect, the invention provides a network file server including data storage for storing a meta file system. The meta file system includes a plurality of file system cells. The network file server has at least one network port coupled to the data storage for providing network clients with access to the meta file system in the data storage. The network file server is programmed for receiving, from a network client, a directory lookup request for an object in the meta file system, and in response, performing a directory lookup for the object, and returning to the network client a file handle for the object, the file handle including an identifier of a file system cell including the object, and a pointer to the object in the file system cell. The network file server is also programmed for receiving, from the network client, a request for access to the object, the request for access to the object including the file handle for the object, and in response to receipt of the request for access to the object, extracting the file system cell identifier and the object pointer from the file handle included in the request for access, using the file system cell identifier to find the file system cell that includes the object, and using the object pointer to find the object in the file system cell.

In accordance with yet still another aspect, the invention provides a network file server including a cached disk array and a plurality of data mover computers for moving data between a data network and a meta file system stored in the cached disk array. The meta file system includes a plurality of file system cells. Each of the file system cells has a respective one of the data mover computers assigned exclusive management of metadata of the file system cell. The network file server is programmed for storing a routing table in each of the data mover computers. The routing table in each of the data mover computers includes an entry for each file system cell, each entry including a respective file system cell identifier and associating the respective file system cell identifier with a pointer to the respective one of the data mover computers assigned exclusive management of metadata of the file system cell identified by said respective file system cell identifier. The network file server is also programmed for responding to receipt of a request from the network for a file handle for a file by producing a file handle for the file, the file handle containing a file identifier obtained from the file system cell and a file system identifier for the file system cell containing the file. At least one of the data mover computers is programmed for receiving a subsequent request from the network for access to the file, the request for access to the file including the file handle, and for responding to the request for access to the file by accessing the routing table in the at least one of the data mover computers to obtain the pointer to the respective one of the data movers assigned exclusive management of metadata of the file system cell containing the file in order to obtain management of metadata of the file system cell containing the file in order to access to the file.

BRIEF DESCRIPTION OF THE DRAWINGS

Other objects and advantages of the invention will become apparent upon reading the detailed description with reference to the drawings, in which.

Figure 1:
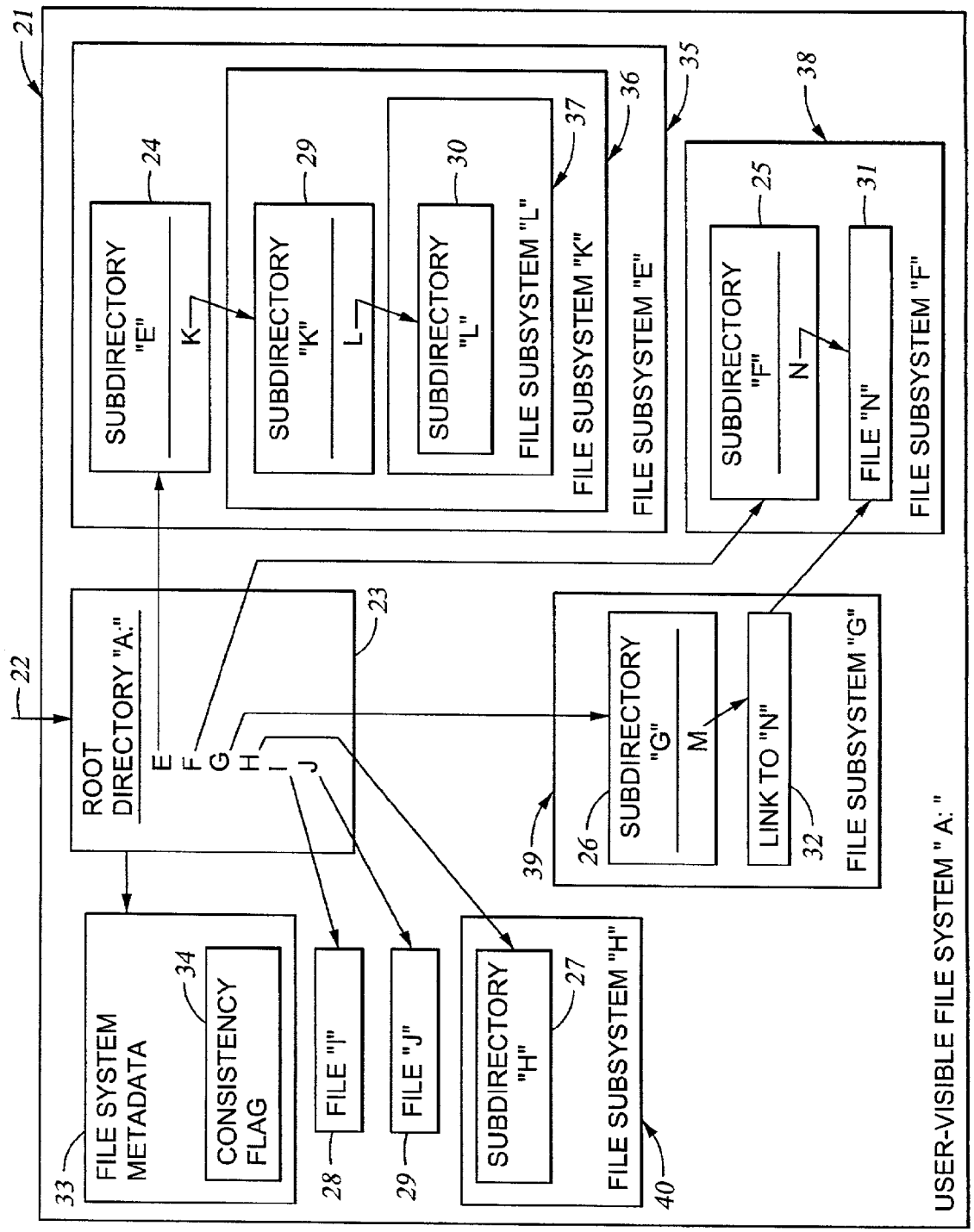
FIG. 1 is a block diagram of a file system as seen by a user or application program.

While the invention is susceptible to various modifications and alternative forms, a specific embodiment thereof has been shown by way of example in the drawings and will be described in detail. It should be understood, however, that it is not intended to limit the form of the invention to the particular form shown, but on the contrary, the intention is to cover all modifications, equivalents, and alternatives falling within the scope of the invention as defined by the appended claims.

DESCRIPTION OF ILLUSTRATIVE
EMBODIMENTS

With reference to FIG. 1, there is shown a block diagram of a file system 21 as seen by a user or application program. The file system is a hierarchy of data objects such as directories, files, and links. The data objects reside in logical blocks of data storage. Typically a contiguous range of logical block numbers of data storage is allocated to store the file system objects and additional objects that might be added to the file system.

Typically a user or application program accesses an object in the file system by providing a path name for the object. Given the path name, an operating system program known as a file system manager searches the file system hierarchy for the specified object. The file system manager accesses the file system from an entry point 22, which is the beginning of a root directory 23 named "A:".

The root directory has a list of directory entries, each of which points to a file system object. Each entry, for example, includes a name of the object pointed to by the entry, and an object type attribute indicating whether the object is a subdirectory, a file, or a link. For example, the root directory 23 lists a subdirectory 24 named "E", a subdirectory 25 named "F", a subdirectory 26 named "G", a subdirectory 27 named "H", a file 28 named "I", and a file 29 named "J". Each subdirectory may also list subdirectories, files, and links. For example, the subdirectory 24 named "E" lists a subdirectory 29 named "K", and the subdirectory named "K" lists a subdirectory 30 named "L". The subdirectory 25 named "F" lists a file 31 named "N". The subdirectory 26 named "G" lists a link 32 named "N". The link 32 includes a pointer to the file 31 named "N".

The file system 21 also includes file system metadata 33 including attributes of the file system itself, such as a volume label, and ownership and access permissions, and various date-time stamps indicating when the file system was last accessed, backed up, defragmented, and checked for errors. The file system metadata 33 also state information used by the operating system for maintaining consistency of the file system during read-write operations and for recovery of the file system after a system crash. Typically, before or after images of updated portions of the file system are written to a log file, and then the updates are written to the file system. If a crash occurs during the time that the updates were written to the file system, then the log file must be used to recover the file system to a consistent state. The file system metadata may include a consistency flag 34 indicating whether or not an update of the file system is in progress. In other words, the flag is set at the beginning of the update task, and cleared at the end of the update task. Alternatively, an indication of whether or not an update of the file system is in progress can be written into the log file. In any case, recovery from a system crash typically involves inspecting the file system or the log in storage to determine whether or not it is possible for the file system to be in an inconsistent state, and if it is possible for the file system to be in an inconsistent state, then the entire file system is scanned to check and correct for any inconsistency between the file system and the log.

The fact that conventional file system managers and crash recovery programs treat the file system as a "consistency block" has caused problems for crash recovery of large file systems. Users normally enjoy benefits from large file systems, because they are easier to manage and easier to back up than a larger number of smaller file systems. When a system crash occurs, however, it may take hours to repair a file system larger than 100 gigabytes. Because file system size limits have increased to at least 800 gigabytes, and users frequently add rather than delete new data and new files, users and system administrators may not be prepared for the delay that should be expected for recovery from a system crash.

The present invention solves the problem of large file systems by recognizing that it is possible for users, and application programs such as backup programs, to have a view of the file system that is different from the file system organization seen by the operating system and crash recovery programs. The user and application programs can see one very large file system, and the operating system and crash recovery programs can see a collection of smaller file systems that include all of the objects in the one very large file sytem. Because file systems traditionally have been managed at the operating system level, the smaller file systems will be considered as real file systems, and the collection of file systems seen by the user as one file system will be referred to as a "meta file system." The file systems in the meta file system will be referred to as "file system cells." The present invention also provides a meta file system manager in the operating system for permitting users and application programs to access the meta file system as if the meta file system were one large conventional file system.

The file system of FIG. 1 could be broken down into file system cells in various ways. Specifically, each subdirectory in the file system 21 is a directory of a file subsystem in the file system 21. As shown in FIG. 1, the file system 21 includes a file subsystem 35 named "E", a file subsystem 36 named "K", a file subsystem 37 named "L", a file subsystem 38 named "F", a file subsystem 39 named "G", and a file subsystem 40 named "H". Each of these file subsystems could become a file system cell in a meta file system having the same appearance to a user or application program as the file system 21 shown in FIG. 1.

Figure 2:
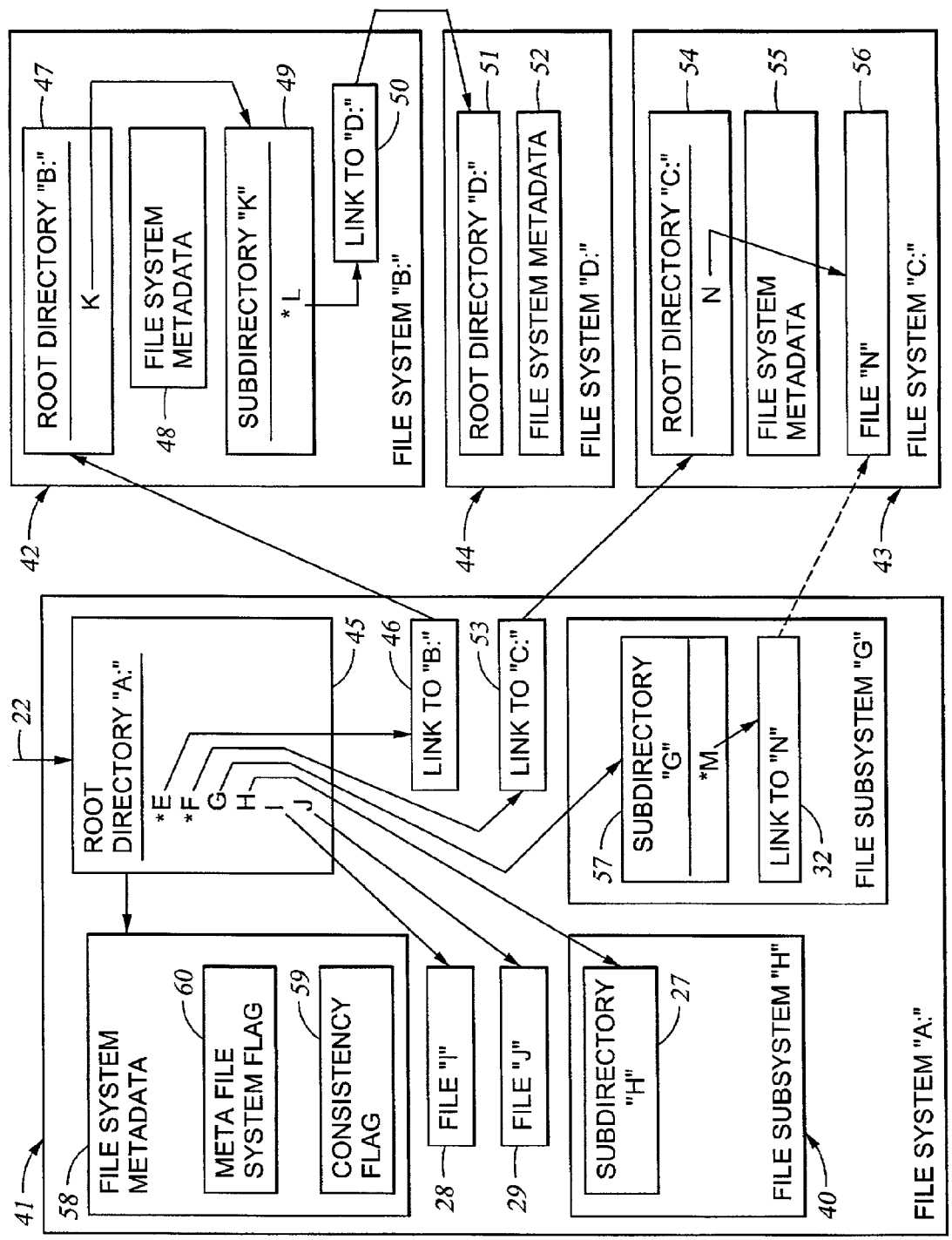
FIG. 2 is a block diagram of a meta file system for implementing the user-visible file system of FIG. 1.

With reference to FIG. 2, there is shown a specific example of a meta file system having the same appearance to the user or application program as the file system of FIG. 1. As shown in FIG. 2, the file system cells of the meta file system consist of a file system 41 named "A:", a file system 42 named "B:", a file system 43 named "C:", and a file system 44 named "D:" The root directory 45 named "A:" in FIG. 2 is similar to the root directory 23 named "A:" in FIG. 1 to the extent that it has entries including object names E, F, G, H, I, and J. In the directory 45 named "A:" in FIG. 2, however, the objects named "E" and "F" have become external links to the root directories 47 and 54 of the file systems 42 and 43 named "B:" and "C:", respectively. For example, each of the entries in the root directory 45 named "A:" has an attribute flag (shown as an asterisk) indicating to the meta file system manager whether or not the entry is for an external link. The root directory entry containing the name "E" points to an external link 46 to the file system cell 42 named "B:", and the root directory entry containing the name "F" points to an external link 53 to the file system cell 43 named "C:" The external links 46 and 53, for example, are files that are hidden from the view of the user or application program, so that they do not appear to the user or application program be files in the root directory 45, and instead the items named "E" and "F" in the root directory 45 appear to the user or application program to be the directory 47 named "B:" and the directory 54 named "C:", respectively. Moreover, to the user or application program, the directory 47 named "B:" and the directory 54 named "C:" appear to be subdirectories, and not root directories. Such external links, which are hidden from the view of the user or application program and which link the file system cells to form the meta file system hierarchy, will be referred to as "direct external links."

The subdirectory 57 named "G" in the meta file system of FIG. 2 is similar to the subdirectory 26 named "G" in the file system of FIG. 1 except that the entry named "M" in the subdirectory 57 named "G" in the meta file system has an attribute flag (shown as an asterisk in front of the M) set to indicate that the entry named "M" is for an external link. This subdirectory entry named "M" points to a link 32 to the file 56 named "N", which appears in the file system cell 43 named "C:". In this case, the link 32 is not hidden from the user or application. Such a user-visible external link will be referred to as an "indirect external link."

The file cells themselves may have a hierarchical arrangement. For example, the file system cell 42 named "B:" has a subdirectory 49 named "K" including the entry containing the name "L" pointing to an external link 50 to the root directory 51 of the file system cell 44 named "D:". Each of the file system cells in the meta file system cell hierarchy includes respective file system meta data 58, 48, 52, 55.

The original file system 21 named "A:" in FIG. 1 has become a file system cell 41 named "A:" in the meta file system of FIG. 2. It is desired that the file system cell "A:" and the other file system cells comply with the conventional format of a file system. In this case, the links in an original file system must be converted to external links that do not cause errors when interpreted by a conventional file system manager. In a UNIX-based file system, for example, a link in an original file system includes a pointer to an inode of the target object. If the target object has been moved to another file system cell, then this pointer will be invalid. Nor can the pointer simply be changed to point to a new inode for the target, because the pointer values are inode numbers that are local to each file system. Therefore, it may be desirable to put any link in the original file system into a form that is recognized by the conventional file system manager as an empty target, so that the conventional file system manager will not attempt to access a target for the link. Nevertheless, an external link needs to contain something that can be interpreted by the meta file system manager as a pointer to the new location of the target in the new file system cell. Preferably this pointer is not in the form of a logical block number or inode number in the new file system cell, because then the logical block number or inode number of the target may change if and when the new file system cell is reorganized. The new file system may be reorganized, for example, by converting a file subsystem containing the target object into a new file system cell.

One solution to the problem of links in the user-visible file system is to use the user-visible pathname of the target object as the target object specification in any external link converted from an internal link appearing in the user-visible file system. For example, the link 32 to the file named "N" in FIG. 2 would include the user-visible pathname "A:\F\N." Therefore, the target object specification need not be changed in response to any reorganization of the meta file system that does not affect the user-visible file system. Nevertheless, the use of the user-visible pathname for the target object specification will introduce some search delay for finding the target, and therefore the liberal use of links in the user-visible path specification should be discouraged.

In contrast, the direct external links (such as links 46 and 53 in FIG. 2) that are created during meta file system creation or reorganization may contain a target specification that is simply the name of the new file system cell (such as "B:" or "C:" for the respective external links 46 and 53). Although these file system cell names are invisible to the user or application, they define the meta file system hierarchy and therefore should be maintained by appropriate modification if and when they would be affected by any file system reorganization.

Due to the use of external links in the file system cells of the meta file system, it is desirable to include a meta file system flag (such as the flag 60 in the file system metadata 58) in the file system metadata of any file system cell that includes external links. In the meta file system of FIG. 2, for example, the meta file system flag 60 is set, a similar flag (not shown) in the file system metadata 48 is set, a similar flag (not shown) in the file system metadata 52 is not set, and a similar flag (not shown) in the file system metadata 55 is not set. When set, such a meta file system flag would indicate that access of the file system cell with a conventional file system may result in unexpected behavior or a report of an empty link. For example, an attempted execution or access of the link file could result in an immediate return or a user message "target not found." If the user or application would desire to access the target objects of the external links, then the file system cell should be accessed with a meta file system manager, as further described below with reference to FIGS. 4 to 7.

Figure 3:
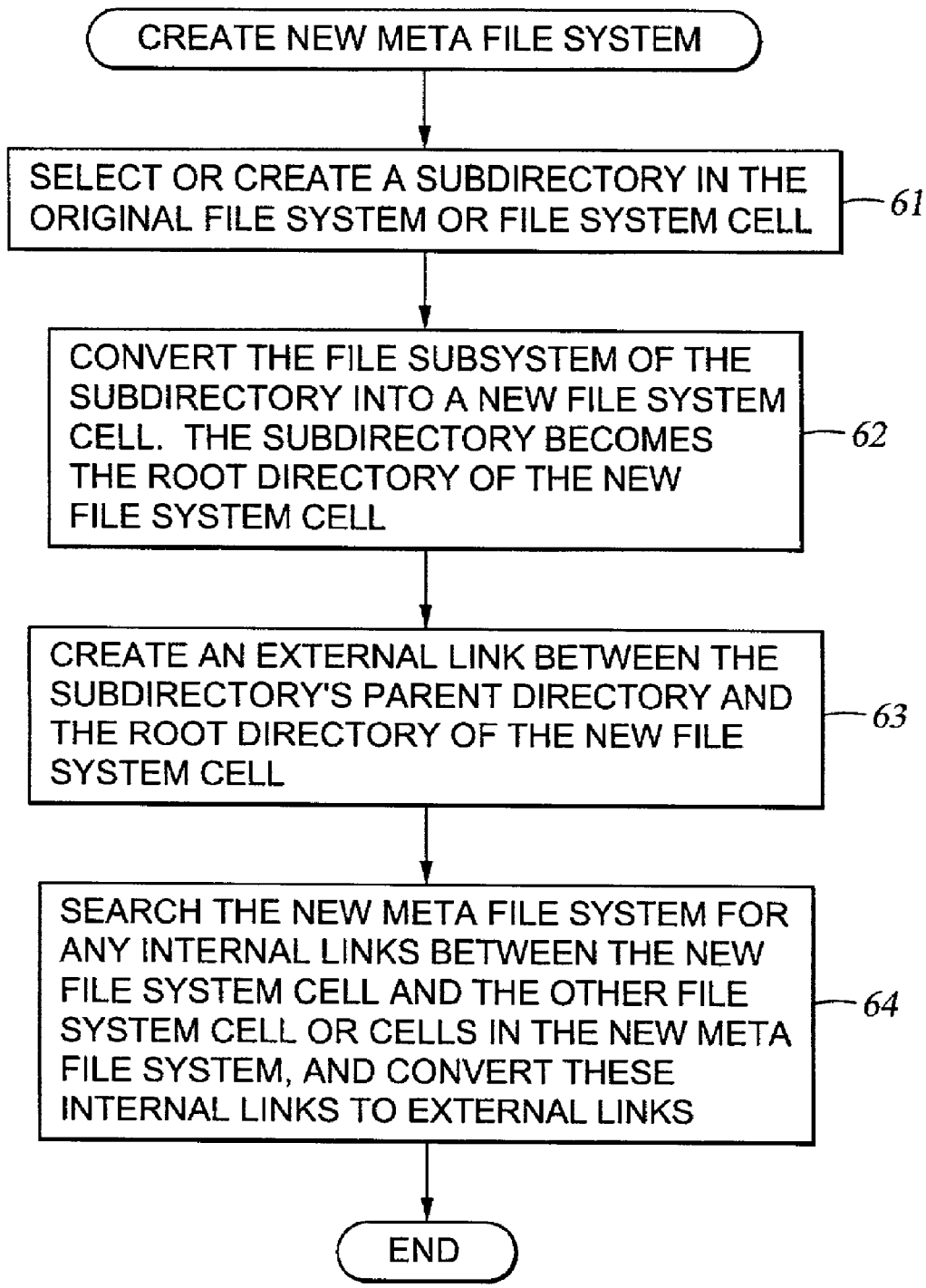
FIG. 3 is a flow chart of a procedure for creating a new meta file system from an original file system or an original meta file system.

With reference to FIG. 3, there is shown a flow chart of a procedure for creating a new meta file system from an original file system or from an original meta file system. In a first step 61, a subdirectory is selected or created in the original file system or in a file system cell of the original meta file system. Next, in step 62, the file subsystem of the selected subdirectory is converted into a new file system cell. The subdirectory becomes the root directory of the new file system cell. In step 63, an external link is created between the subdirectory's parent directory and the root directory of the new file system cell. This external link is placed at the same level in the hierarchy of the meta file system as subdirectory's parent directory. Finally, in step 64, the new meta file system is searched for any internal links between the new file system cell and the other file system cell or cells in the new meta file system. If any such internal link is found, it is converted to an external link.

Figure 4:
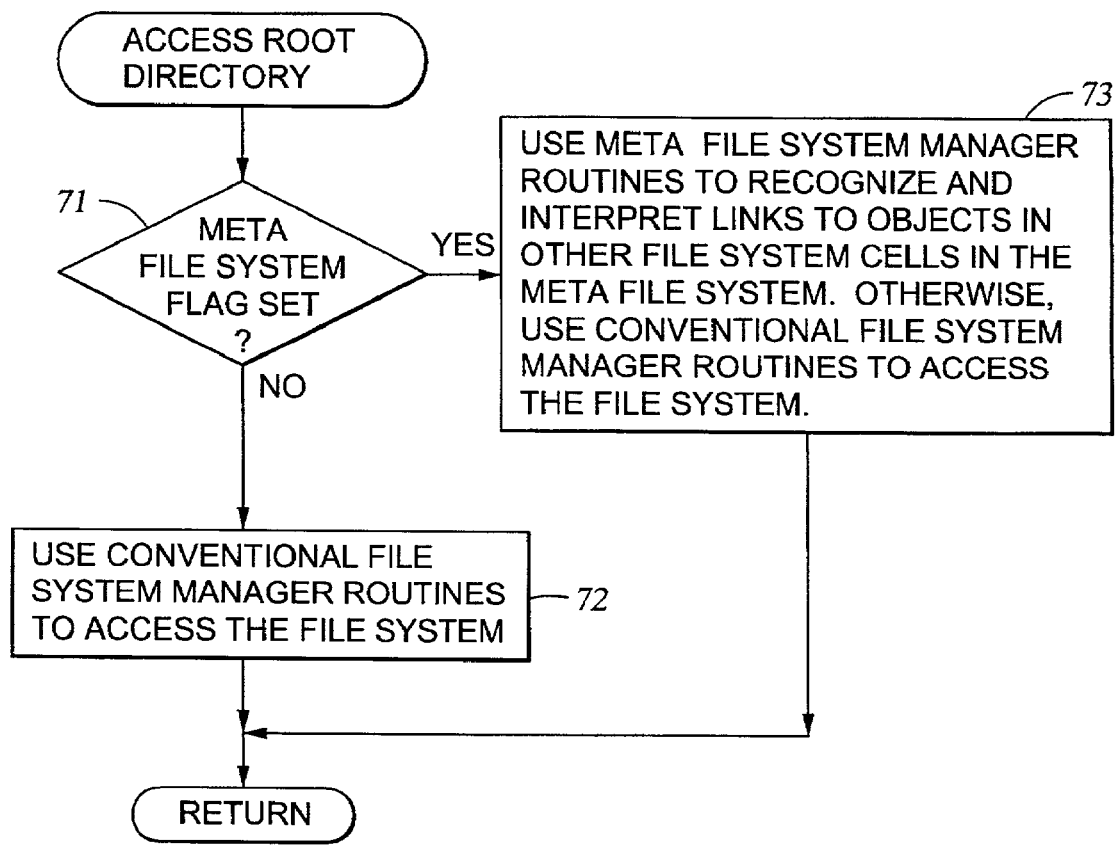
FIG. 4 is a flow chart of a meta file system manager routine for accessing a root directory of a file system cell in the meta file system of FIG. 2.

With reference to FIG. 4, there is shown a flow chart of a routine in a meta file system manager for accessing the root directory of a file system cell. In a first step 71, the meta file system manager inspects the file system meta data to determine whether the meta file system flag is set. If the meta file system flag is not set, then execution continues to step 72 to use conventional file system manager routines to access the file system. Otherwise, if the meta file system flag is set, then execution branches from step 71 to step 73. In step 73, the meta file system manager uses some special routines to recognize and interpret external links to objects in other file system cells in the meta file system. Otherwise, the meta file system manager uses conventional file system manager routines to access the file system.

Figure 5:
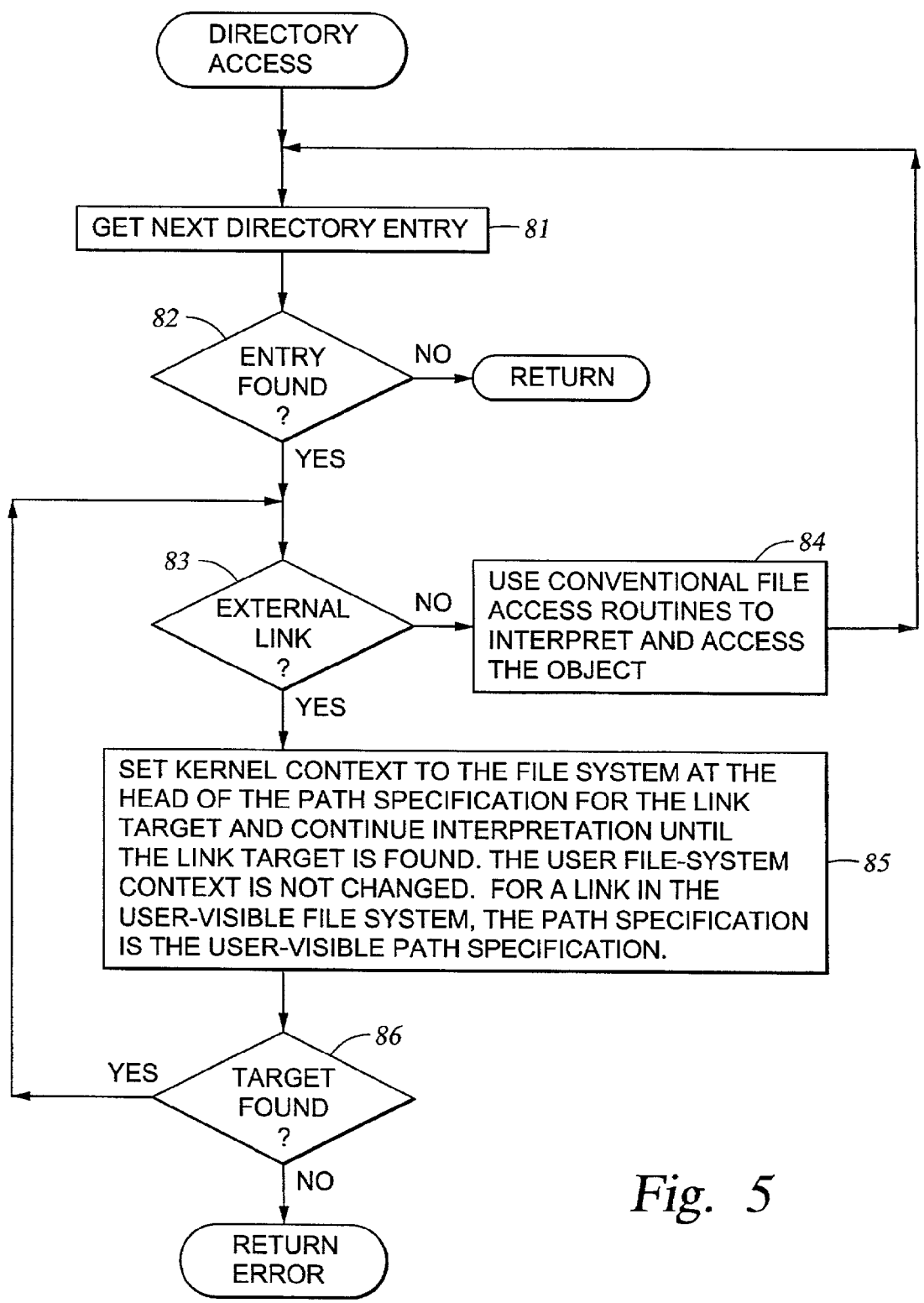
FIG. 5 is a flow chart of a meta file system manager routine for accessing a directory in a file system cell having external links.

With reference to FIG. 5, there is shown a flow chart of a meta file system manager routine for accessing a directory in a file system cell having external links. In a first step 81, the meta file system manager obtains the next entry in the directory. If an entry is not found, as tested in step 82, execution returns. Otherwise, execution continues from step 82 to step 83. In step 83, the meta file system manager checks an attribute for the directory entry to determine whether the directory entry points to an external link. If not, then execution branches from step 83 to step 84 to use conventional file access routines of a conventional file system manager to interpret and access the object. After step 84, execution loops back to step 81.

If in step 83 the meta file system manager determines that the directory entry is for an external link, execution continues from step 83 to step 85. In step 85, the meta file system manager sets the kernel context to the file system at the head of the path specification for the link target and continues interpretation of the path specification until the link target is found in the meta file system. The user file system context, however, is not changed. For a link in the user-visible file system, the path specification is the user-visible path specification. Otherwise, for a direct link that does not appear in the user-visible file system, the path specification is simply the root directory name for another file system cell.

After step 85, execution continues to step 86. In step 86, if a target is not found, then an error message is returned. Otherwise, execution loops back from step 86 to step 83, to test whether the target is itself an external link. Execution then continues until all of the entries in the directory have been accessed, or until step 84 terminates directory access before all of the entries in the directory have been accessed.

Figure 6:
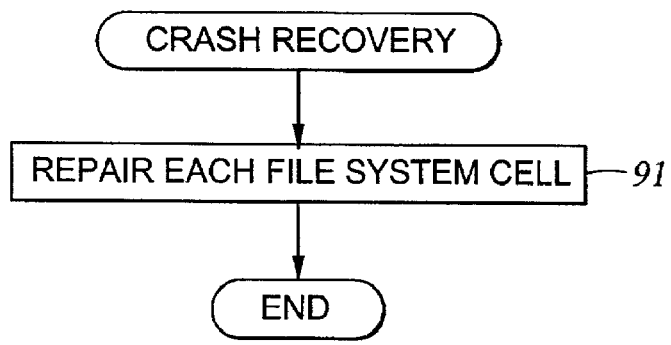
FIG. 6 is a flow chart of a meta file system manager routine for crash recovery of a meta file system.

With reference to FIG. 6, there is shown a flow chart of a meta file system manager routine for crash recovery of a meta file system. In step 91, the meta file system performs a repair of each file system cell in the meta file system. For example, the meta file system manager scans a list of the file system cells in the meta file system. For each file system cell, the meta file system manager calls a repair subroutine as shown in FIG. 7.

Figure 7:
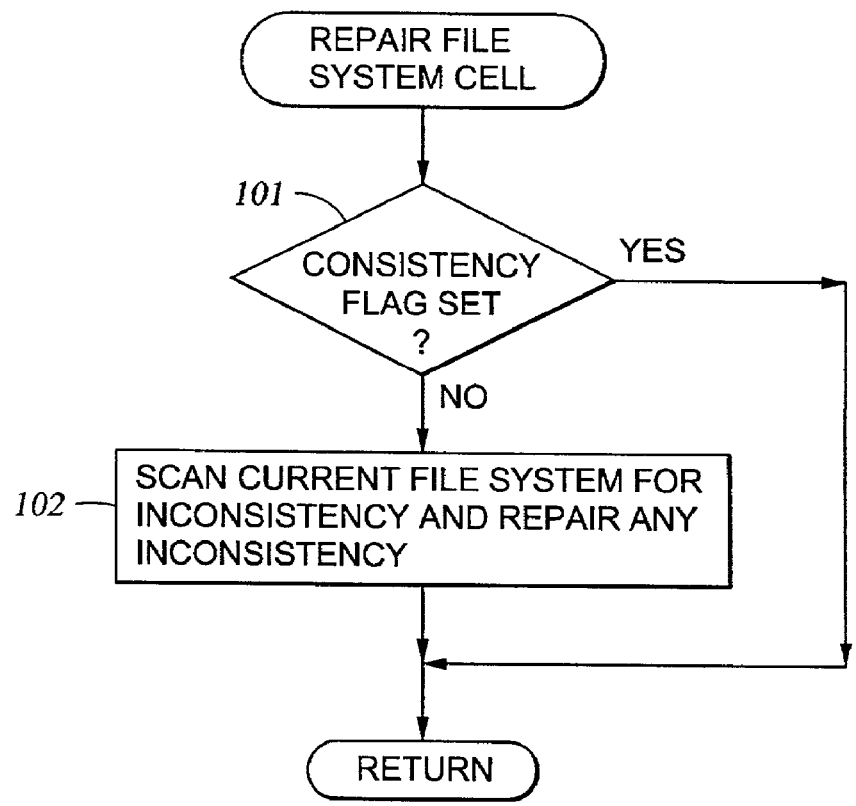
FIG. 7 is a flow chart of a meta file system manager routine for crash recovery of a specified file system.

In the repair subroutine of FIG. 7, the meta file system manager inspects the file system metadata for the file system cell to be repaired. If the consistency flag is set, as tested in step 101, then the subroutine is finished, and execution returns. Otherwise, execution continues to step 102 to scan the file system cell for inconsistency with a log of updates, and to repair any inconsistency that is found. Then execution returns.

As described above, one advantage of a meta file system is to reduce the time for recovery of a large user-visible file system. Another advantage of the meta file system is to permit multi-processor management of a file system by concurrently performing file system access operations in multiple file system cells of the meta file system.

Figure 8:
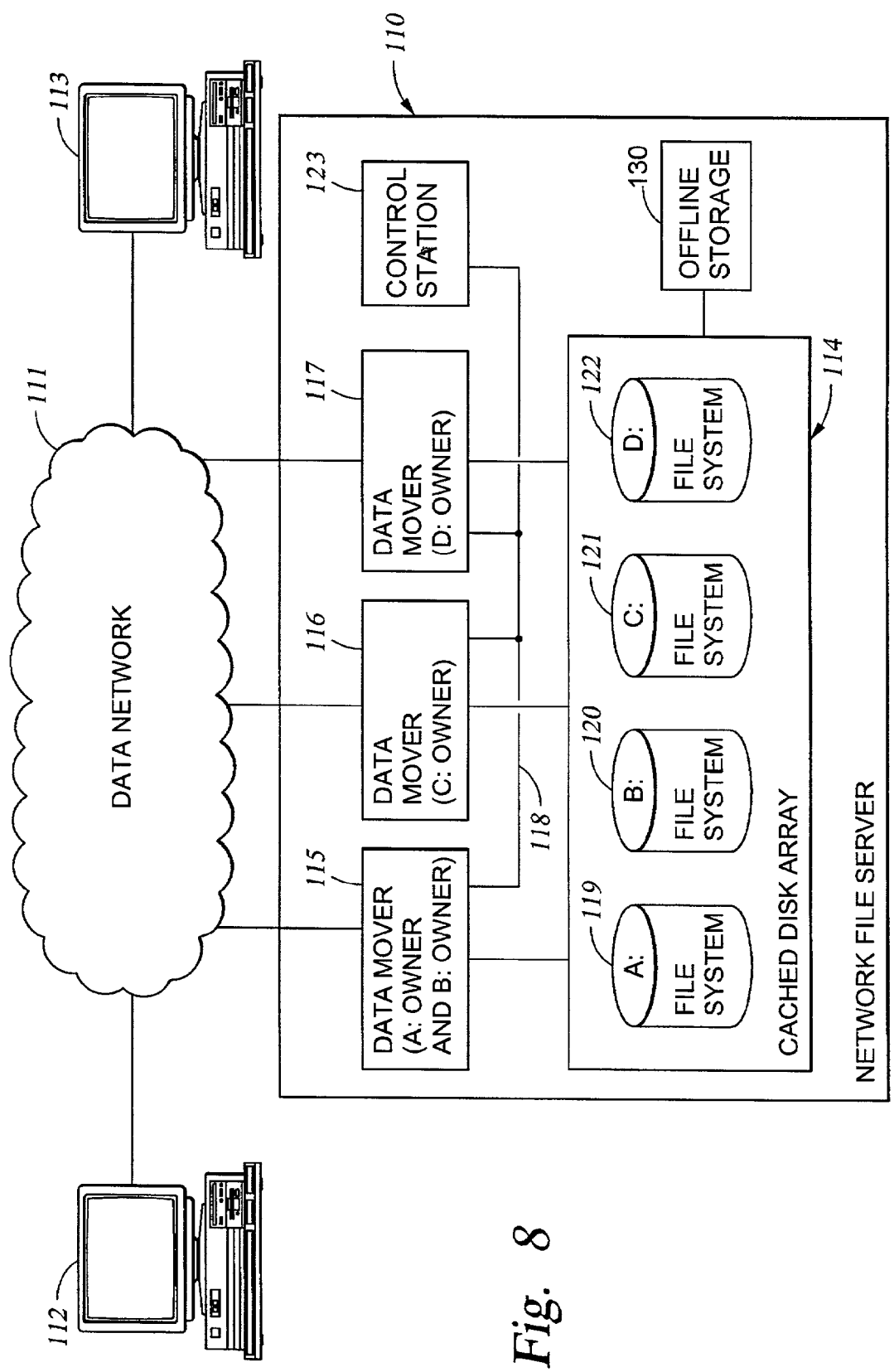
FIG. 8 is a block diagram of a data processing system including a network file server having a plurality of data mover computers, each of which manages a respective file system cell of the meta file system of FIG. 2.

With reference to FIG. 8, there is shown a block diagram of a data processing system including a network file server 110 having a plurality of data mover computers 115, 116, 117, each of which manages a respective file system cell of the meta file system of FIG. 2. The network file server 110 is connected by a data network 111 to a number of clients including work stations 112, 113. The data network 111 may include any one or more network connection technologies, such as Ethernet, and communication protocols, such as TCP/IP or UDP. The work stations 112, 113, for example, are personal computers.

The preferred construction and operation of the network file server 110 is further described in Vahalia et al., U.S. Pat. No. 5,893,140 issued Apr. 6, 1999, incorporated herein by reference. The network file server 110 includes a cached disk array 114. Such a network file server 110 is manufactured and sold by EMC Corporation, 35 Parkwood Dr., Hopkinton, Mass. 01748.

The network file server 110 is managed as a dedicated network appliance, integrated with popular network operating systems in a way, which, other than its superior performance, is transparent to the end user. The clustering of the data movers 115, 116, 117 as a front end to the cached disk array 114 provides parallelism and scalability. Each of the data movers 115, 116, 117 is a high-end commodity computer, providing the highest performance appropriate for a data mover at the lowest cost. The data movers may communicate with each other over a dedicated dual-redundant Ethernet connection 118. The data mover computers 115, 116, and 117 may communicate with the other network devices using standard file access protocols such as the Network File System (NFS) or the Common Internet File System (CIFS) protocols, but the data mover computers do not necessarily employ standard operating systems. For example, the network file server 110 is programmed with a Unix-based file system that has been adapted for rapid file access and streaming of data between the cached disk array 114 and the data network 111 by any one of the data mover computers 115, 116, 117.

The meta file system can be organized so that the file system cell named "A:" does not contain any user or application files. In this case, the file system cell named "A:" is essentially a repository for metadata of the user-visible file system, and information about the configuration of the meta file system. For example, the root directory of the file system cell named "A:" shows how objects in the user-visible root directory are apportioned among other file system cells containing user-visible files. In the example of FIG. 8, the file system cell "A:" is located in data storage 119 in the cached disk array 114, and each of the data movers 115, 116, 117 has shared read-write access to the file system cell "A:" in the data storage 119. Therefore, each of the data movers has non-blocking concurrent read-write access to the information needed for directing a file system access received by any of the data movers to the file system cells (B:, C:, and D:) containing user or application files. Morever, as shown in FIG. 8, the other file system cells (B:, C:, and D:) are also located in respective data storage 120, 121, 122 in the cached disk array 114. Each of the data movers 115, 116, 117 has read-write access to each of the file system cells. However, the data mover 115 exclusively manages access to the file system cell "A:" and the file system "B:" (i.e., it is the "A: owner" and the "B: owner"), the data mover 116 exclusively manages access to the file system cell "C:" (i.e., it is the "C: owner"), and the data mover 117 exclusively manages access to the file system cell "D:" (i.e., it is the "D: owner"). The intial assignment of file system ownership is done at a control station 123 during configuration time.

As shown in FIG. 8, the network file server 110 includes offline storage 130 coupled to the cached disk array. The offline storage 130 may include tape or optical disk storing back-up or offline versions of certain files in the file systems A:, B:, C:. or D:. If data of a particular file presently resides in disk storage of the cached disk array 114, then the file is said to be "online." If data of a particular file does not presently reside on disk storage in the cached disk array 114 but the data resides in the offline storage 130, then the file is said to be "offline."

Figure 9:
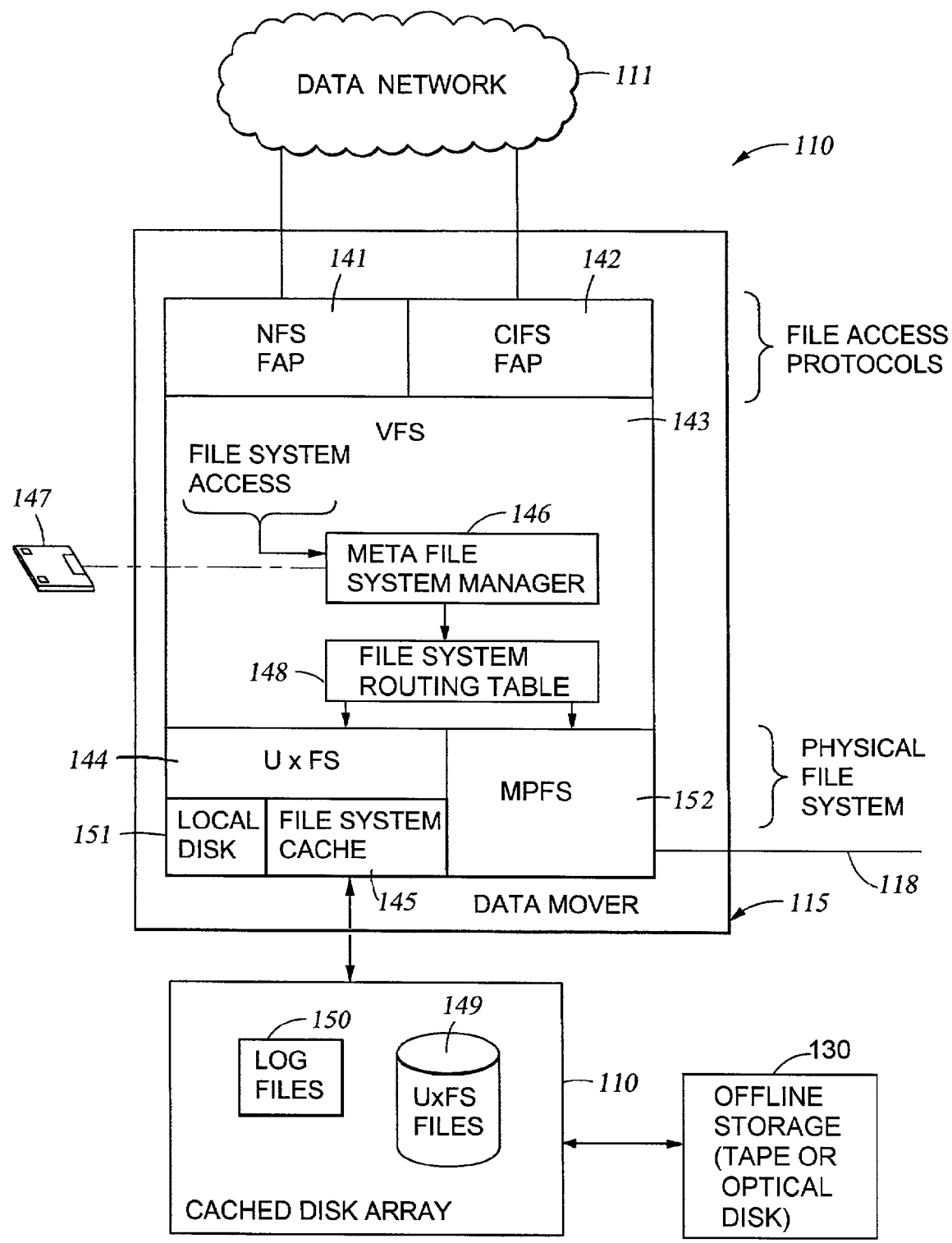
FIG. 9 is a partial view of the data network of FIG. 8, showing in detail one of the data mover computers in the network file server of FIG. 8.

Referring to FIG. 9, there is shown a block diagram of software structure that is replicated in each data mover 115. The software structure includes modules 141 and 142 for the Network File System (NFS) file access protocol (FAP) and the Common Internet File System (CIFS) file access protocol (FAP), a Virtual File System (VFS) 143, and a Unix-based file system (UxFS) 144. The Virtual File System (VFS), which is an industry-standard back-end file system switch, interfaces with the UxFS physical file system 144. VFS translates NFS Common File System requests. (The NFS Common File System requests in themselves are translations of NFS requests to the intended physical file storage devices.) UxFS accesses a file system buffer cache 145 during data transfers between the data network 111 and UxFS files 149 in the cached disk array 110. UxFS also writes updates to a log file 150 just before committing the updates to the UxFS files 149, for example, upon closing a file after a write operation.

As shown in FIG. 9, a meta file system manager 146 is integrated with the VFS module 143. For example, the VFS module 143, including the meta file system manager 146, is read from a machine readable program storage device such as a floppy disk 147, and loaded into local disk data storage 151 of the data mover 115. As introduced above with reference to FIG. 4, the meta file system manager 146 is invoked by file system access calls originally intended for the file system manager access routines in the UxFS 144.

The meta file system manager 146 includes a routine for accessing the root directory of a file system cell. If the meta file system flag for the file system cell is not set, conventional file manager routines in the file system manager are called to access the file system. If the meta file system flag is set, the meta file system manager calls meta file system routines to recognize and interpret external links to objects in other file system cells in the meta file system.

The meta file system manager 146 also includes a routine for accessing a directory in a file system cell having external links. The routine checks an attribute associated with each directory entry to determine whether the directory entry points to an external link. If so, the routine sets the kernel context to the file system at the head of the path specification for the link target and continues interpretation of the path specification until the link target is found in the meta file system.

In operation, a client makes a request for access to a file stored in a cached disk array 110 over the data network 111 using a standard protocol such as the NFS protocol or the CIFS protocol. When using the NFS protocol, for example, a client first issues an NFS lookup request including a path to a file and the filename for the file to be accessed. The lookup request returns a file handle for a file entry corresponding to the file. The client uses the file handle in subsequent requests for access to the file. These subsequent requests are interpreted by the NFS routines 141 and forwarded to the meta file system manager 146.

The CIFS protocol is based on the connection-oriented Transmission Control Protocol (TCP). A file system can be shared amongst CIFS clients by forwarding requests between a group of CIFS servers. The group of CIFS servers appears to the CIFS clients as a single file server and provides enhanced data availability, reliability and storage capacity. When using the CIFS protocol, for example, the client sends a series of commands to the network file server, including a NEGOTIATE command to initiate communication with the network file server, a SESSION_SETUP command for verification of the client's name and credentials, a TREE_CONNECT command for access to specified file system, and then a number of file access commands such as OPEN, READ, and CLOSE, followed by a TREE_DISCONNECT command. The CIFS server routines 142 receive the CIFS request from the client and forward the request through the Virtual File System (VFS) to the meta file system manager 146. For example, in the TREE_CONNECT command, the client transmits the name of the file system that the client wants to access, and the server returns a tree id (Tid) that the client uses in subsequent commands to refer to the file system. In the OPEN command, the client transmits the name of the file, relative to the Tid, that the client wants to open. The network file server returns a file handle, referred to as the file id (Fid). In the READ command, the client supplies the Tid, Fid, file offset, and number of bytes to read.

In order to process a file access request, the meta file system manager 146 may need data or metadata of a file system object. In such a case, the meta file system manager 146 accesses a file system routing table 148 in order to determine the data mover that owns the file system object. If the data mover 115 owns the object, then the object is local, and the meta file system manager 146 accesses data or metadata of the file system object through UxFS 144. If the data mover 115 does not own the file system object, then the object is said to be "remote" and the data mover 115 is said to be "secondary" with respect to the object. When the file system object is remote, the meta file system manager 146 accesses data or metadata of the file system object through a Multiplex File System (MPFS) 152.

Figure 10:
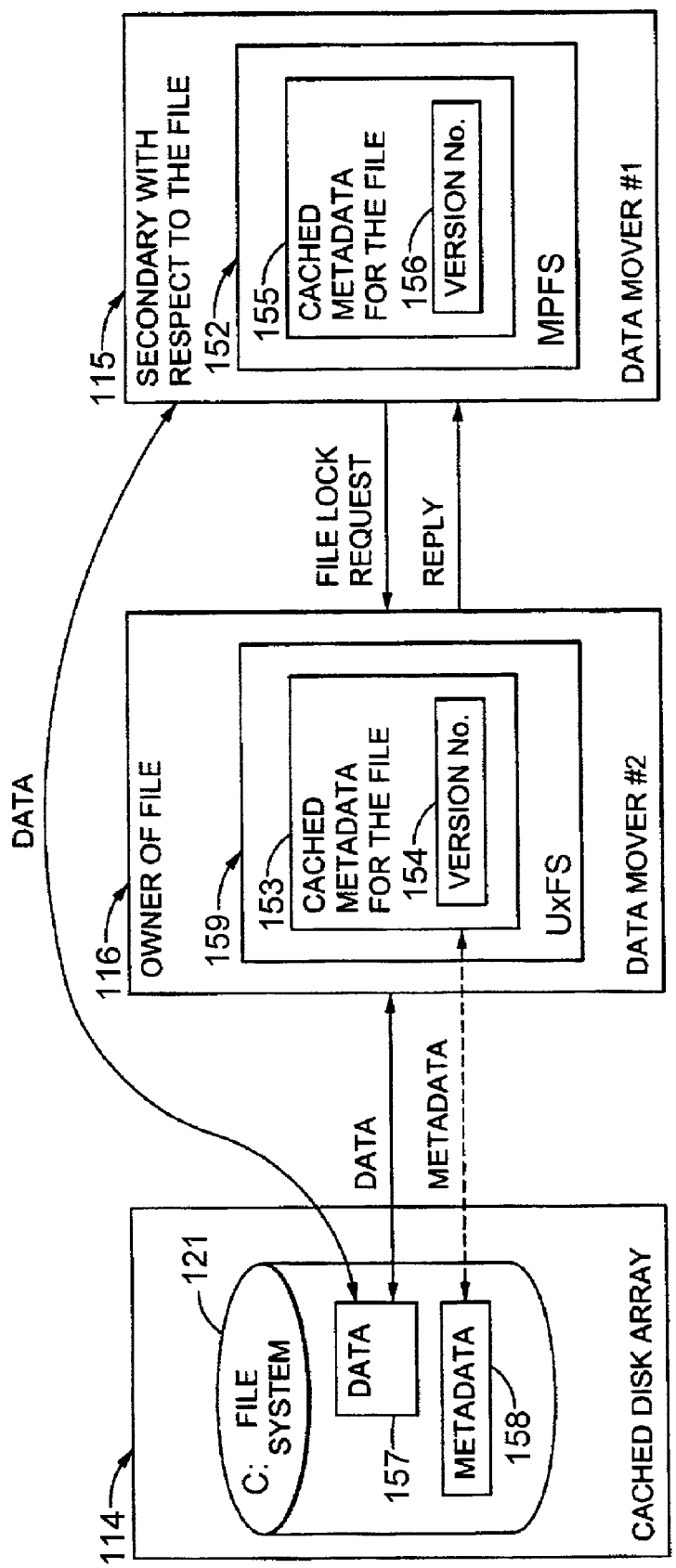
FIG. 10 is a block diagram showing the management of metadata for a file in a data mover that owns the file and a data mover that is secondary with respect to the file.

FIG. 10 shows how the MPFS 152 of the data mover 115 accesses data or metadata of a file in the file system "C:" owned by the data mover 116. In this case the file's metadata 153 is cached inside UxFS 159 in the data mover 116, and the metadata log is updated only by a synchronous write, so that the metadata 158 is only known to the owner, data mover 116. Therefore, the metadata 158 is sent to the secondary data movers (such as the data mover 115) if they also want to operate on the file. A version number 154 associated with the metadata of each file is used to guarantee that every data mover always uses the most up-to-date version of the metadata to access the file. Metadata is also cached on secondary data movers to improve performance. This metadata 155 is cached inside MPFS 152 in the secondary data mover 115. This metadata 155 also has an associated version number 156. Every time the metadata is changed on a data mover, the version number associated with that metadata on that data mover is increased by one. During a commit or close operation, new metadata is written back from the owner's metadata cache 153 to metadata storage 158 of the file system 121 in the data storage device (such as the cached disk array 114). To avoid a data security problem, the metadata 158 in the file system 121 is always written back to data storage after the corresponding data 157 has been updated.

To access the file in the file system "C:", the secondary data mover 115 sends a file lock request, including its metadata version number 156 for the metadata of the file, to the data mover owner 116 of the file. The data mover replies with a lock grant or lock denied message and also returns new metadata if the metadata version number 156 from the secondary data mover 115 is different from its metadata version number. When the file lock has been granted and the secondary data mover has a current version of the file's metadata, the secondary data mover 115 may directly access the file data 157 in the storage 121 of the cached disk array, over a data path that bypasses the data mover owner 116 of the file. When the secondary data mover 115 has finished accessing the file, it sends a confirmation of a release of the file lock, including any change to the file metadata that may have occurred due to the file access. Further details regarding the operation of the MPFS 152 are found in the above-cited Vahalia et al. U.S. Pat. No. 6,324,581.

Figure 11:
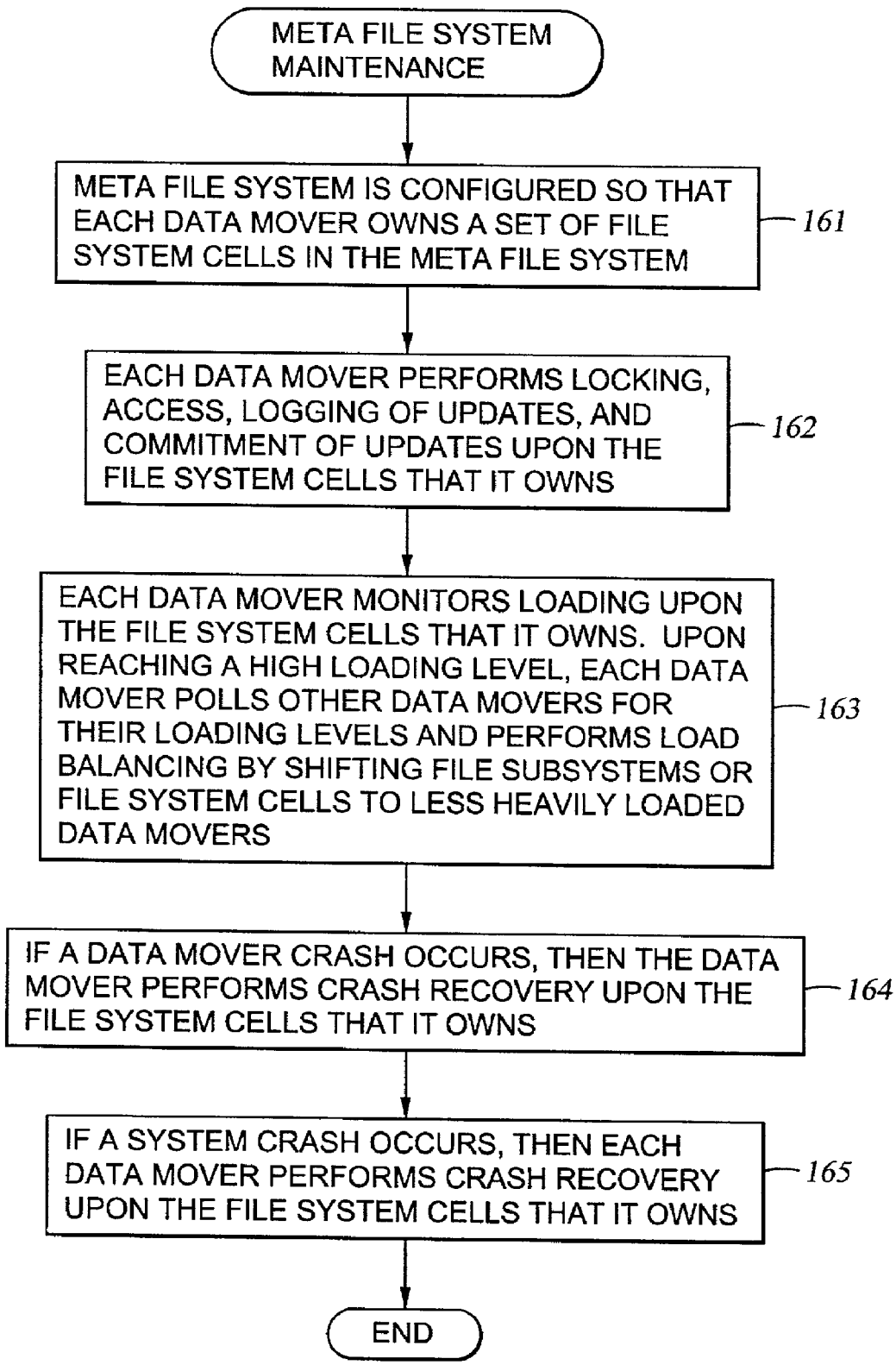
FIG. 11 is a flow chart showing how the data mover computers in the data processing system of FIG. 8 manage their respective cells in the meta file system of FIG. 2.

With reference to FIG. 11, there is shown a flow chart of a procedure by which the data mover computers in the data processing system of FIG. 8 manage their respective file system cells in the meta file system of FIG. 2. In a first step 161, the meta file system is configured so that each data mover owns a set of file system cells in the meta file system. Then in step 162, each data mover performs locking, access, logging of updates, and commitment of updates upon the file system cells that it owns. If a data mover receives from a network client a request for access to a meta file system object in a file system cell that the data mover does not own, then the data mover forwards the request to the data mover that owns the file subsystem cell, and also returns any reply to the network user having originated the request.

In the preferred implementation (as described above with reference to FIG. 11), a data mover that does not own a file system cell to be accessed sends a lock request to the data mover that owns the file system cell to be accessed, and the data mover that owns the file system cell to be accessed returns a grant of a lock on an object in the file system cell to be accessed. The data mover that does not own the file system cell to be accessed can then access the object directly in the cached disk array for satisfying the client's request, without passing object data through the data mover that owns the file system cell to be accessed. In this alternative arrangement, however, it is still preferred for the data mover that owns the file system cell to maintain and update the meta data for the objects in the file system cell that it owns. Once the access for the client is completed, the data mover not owning the file system cell sends a notification of a release of the lock to the data mover that owns the file system that is accesses.

In step 163, each data mover monitors loading upon the file system cells that it owns, and upon reaching a high loading level, the data mover polls other data movers for their loading levels. If a data mover having a sufficiently lower loading level is found, then load balancing is performed by shifting file subsystems or file system cells from the more heavily loaded data mover to the less heavily loaded data mover. A shifted file subsystem becomes a new file system cell in the meta file system. A shift of a file system cell is a change in data mover ownership of the file system cell. In either case, the shift is performed by adding or changing linkages in the meta file system hierarchy, and is essentially a change in pointers to file data. The file data itself need not be moved in the storage of the cached disk array.

In step 164, if a data mover crash occurs, then once the data mover having crashed is re-booted, it performs crash recovery upon the file system cells that it owns. In step 165, if a system crash occurs, then each data mover in the network file server performs crash recovery upon the file system cells that it owns. This completes the flow chart in FIG. 11 of the procedure for maintenance of the meta file system in the network file server in FIG. 8.

Figure 12:
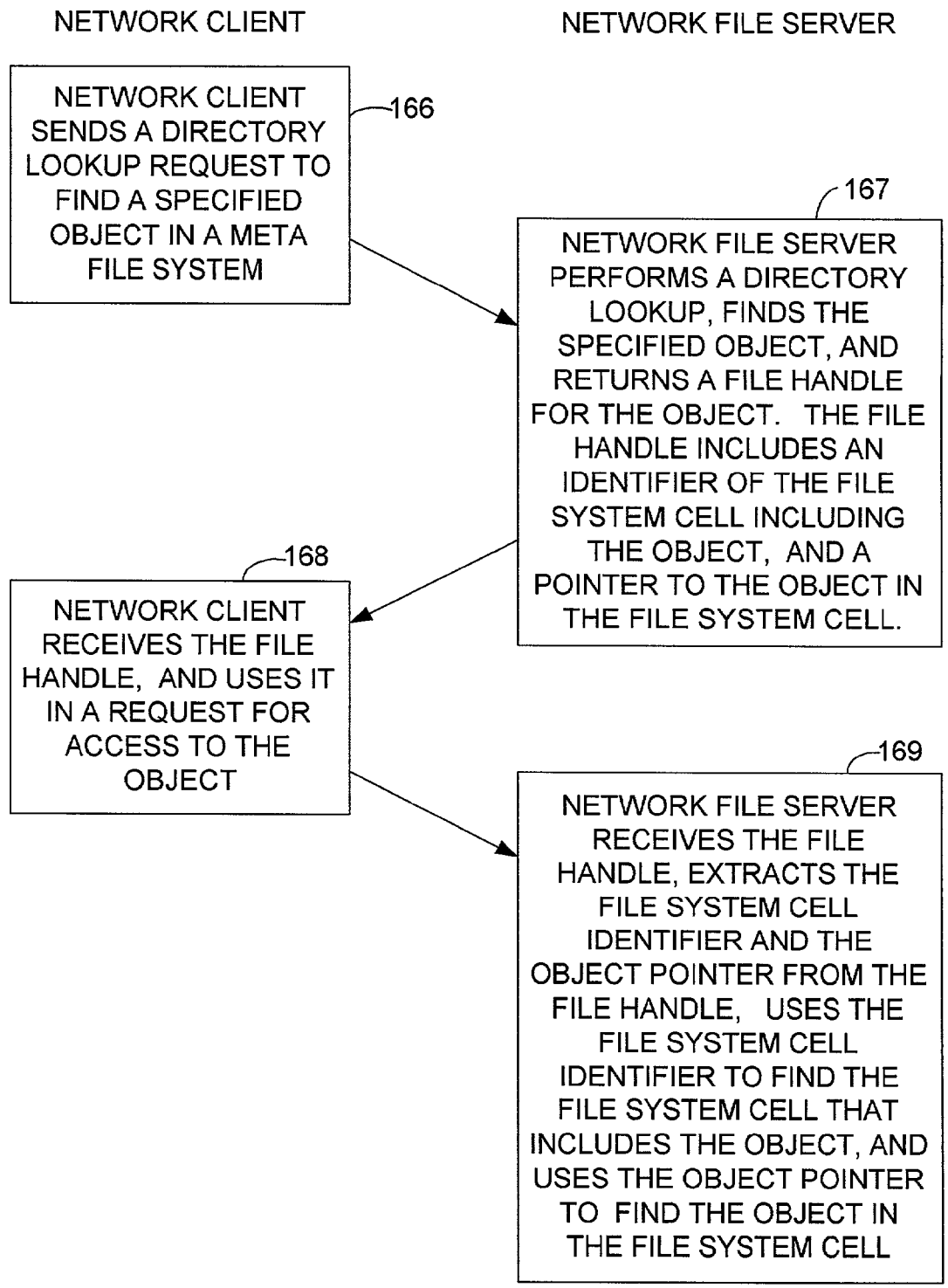
FIG. 12 is a flow chart showing a network protocol for file access in accordance with one aspect of the present invention.

FIG. 12 shows a flow chart of a network protocol for file access in accordance with an aspect of the present invention. In a first step 166, a network client sends to the network file server a directory lookup request to find a specified object in a meta file system.

In step 167, the network file server receives the directory lookup request, and in response performs a directory lookup, finds the specified object in a file system cell in the meta file system, and returns a file handle for the object. The file handle includes an identifier of the file system cell including the object, and a pointer to the object in the file system cell.

In step 168, the network client receives the file handle from the network file server, and uses it in a request to the network file server for access to the object.

In step 169, the network file server receives the file handle, and extracts the file system cell identifier and the object pointer from the file handle. The network file server uses the file system cell identifier to find the file system cell that includes the object, and uses the object pointer to find the object in the file system cell.

Figure 13:
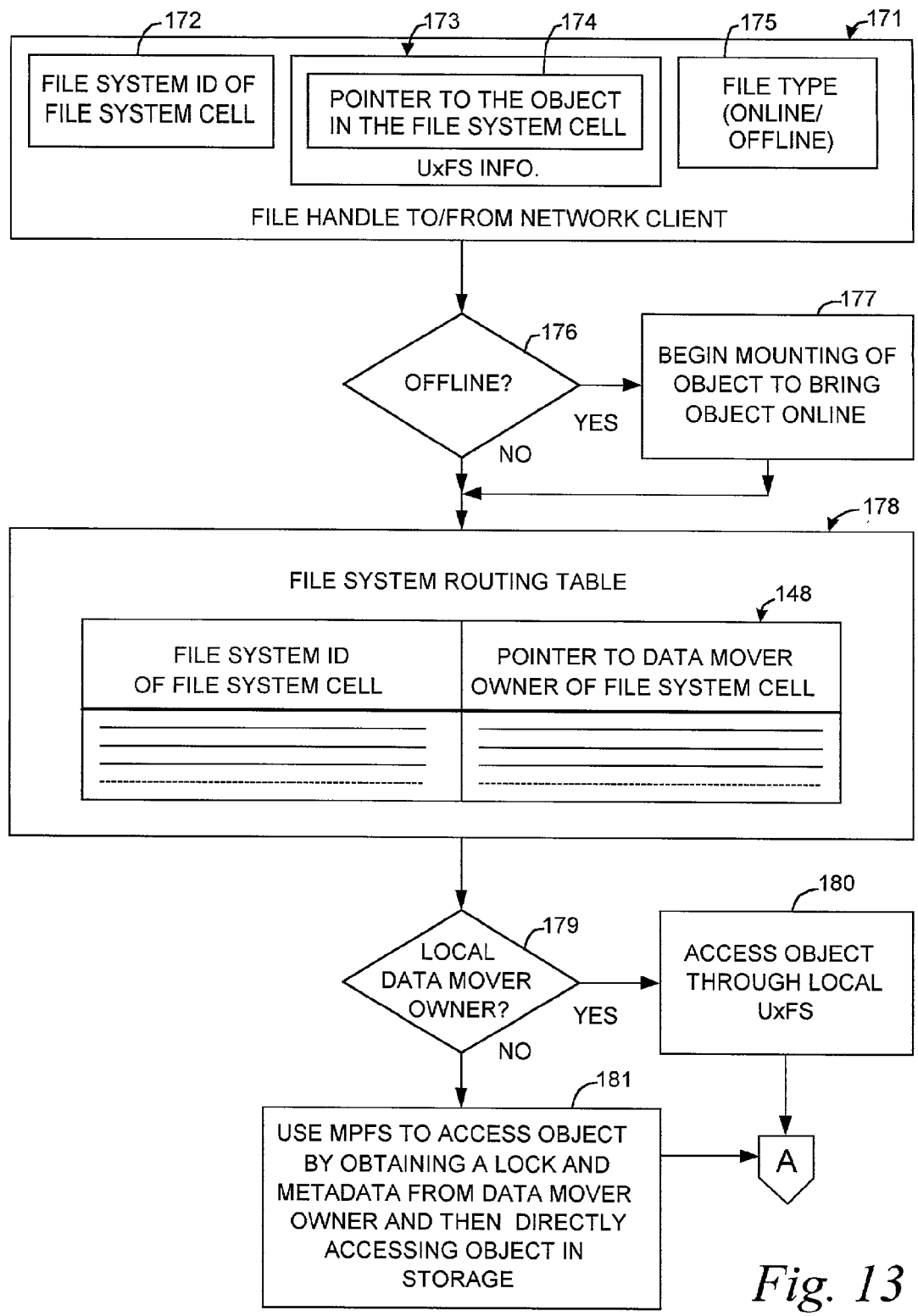
FIG. 13 is a flow chart showing how information in a file handle is used to access an entry in a routing table for routing a file access request in the network file server of FIG. 8.

FIG. 13 shows how information in a file handle 171 is used to access an entry in the file system routing table (148 in FIG. 9). In this example, the meta file system manager (146 in FIG. 9) responds to a directory lookup request in such a way that the file handle 171 returned to the client in response to a directory lookup request specifying a path name and a file system object name includes a file system ID 172 of the file system cell including the file system object in addition to a pointer 174 to the object in the file system cell. In particular, in response to a network client's directory lookup request specifying a meta file system path name and a name of an object in the meta file system, the meta file system manager (146 in FIG. 9) translates the directory lookup request to a file system cell identifier, and a UxFS directory lookup request including the name of a path in the file system cell, and the name of the object in the file system cell. UxFS responds to the directory lookup request by returning UxFS information about the object, including a pointer to the object in the file system cell. The meta file system manager 146 receives the UxFS information 173, and creates the file handle 171 by appending, to the UxFS information 173, a file system ID 172 of the file system cell, and also a file type 175 including an indication of whether the object is online or offline. The file type 175 may include additional descriptive information about the file, such as the file format (e.g., text, graphics or video) or identification of a particular application program associated with the file. The meta file system manager 146 returns this file handle 171 to the network client.

In a specific implementation, for example, the UxFS information returned to the meta file system manager is a FILE structure including a pointer to a buffer for temporarily storing contents of the file, a count of the number of characters stored in the buffer, a pointer to the next character position in the buffer, flags for storing the access mode (read and write permissions for owner, group and others) and a file descriptor including a file identifier and a generation count used to validate the file identifier. The meta file system file handle 171 is 128 bits with a 32-bit file type, a 32-bit file system identifier of the file system cell, a 32-bit UxFS file identifier pointing to the object in the file system cell, and a 32-bit UxFS generation count. The maximum number of bits in the file handle 171 is dependent on the maximum number of bits that the network protocol allows for the file handle.

In an embodiment using the NFS protocol, the meta file system file handle is limited by the 32 or 64 bytes allowed by the NFS protocol. Thus, the file handle can be expanded in other embodiments from the sixteen bytes in this specific implementation to include more UxFS information or increase the maximum possible number of file system cells in the meta file system. However, the present invention is not limited to use of the NFS protocol, and other protocols, such as the CIFS protocol, could be used for sending a file handle between the network file server and a network client.

In subsequent requests from the client, the meta file system manager extracts the file system identifier of the file system cell 172 and also the file type 175 from the file handle 171. If the file type 175 indicates that the object is offline, as tested in step 176 of FIG. 13, then execution branches to step 177 to begin mounting of the object from offline storage (130 in FIG. 9) to bring the object online by copying the file data from the offline storage medium (tape or optical disk) to the online storage medium (magnetic disk storage in the cached disk array 110 in FIG. 9).

Figure 15:
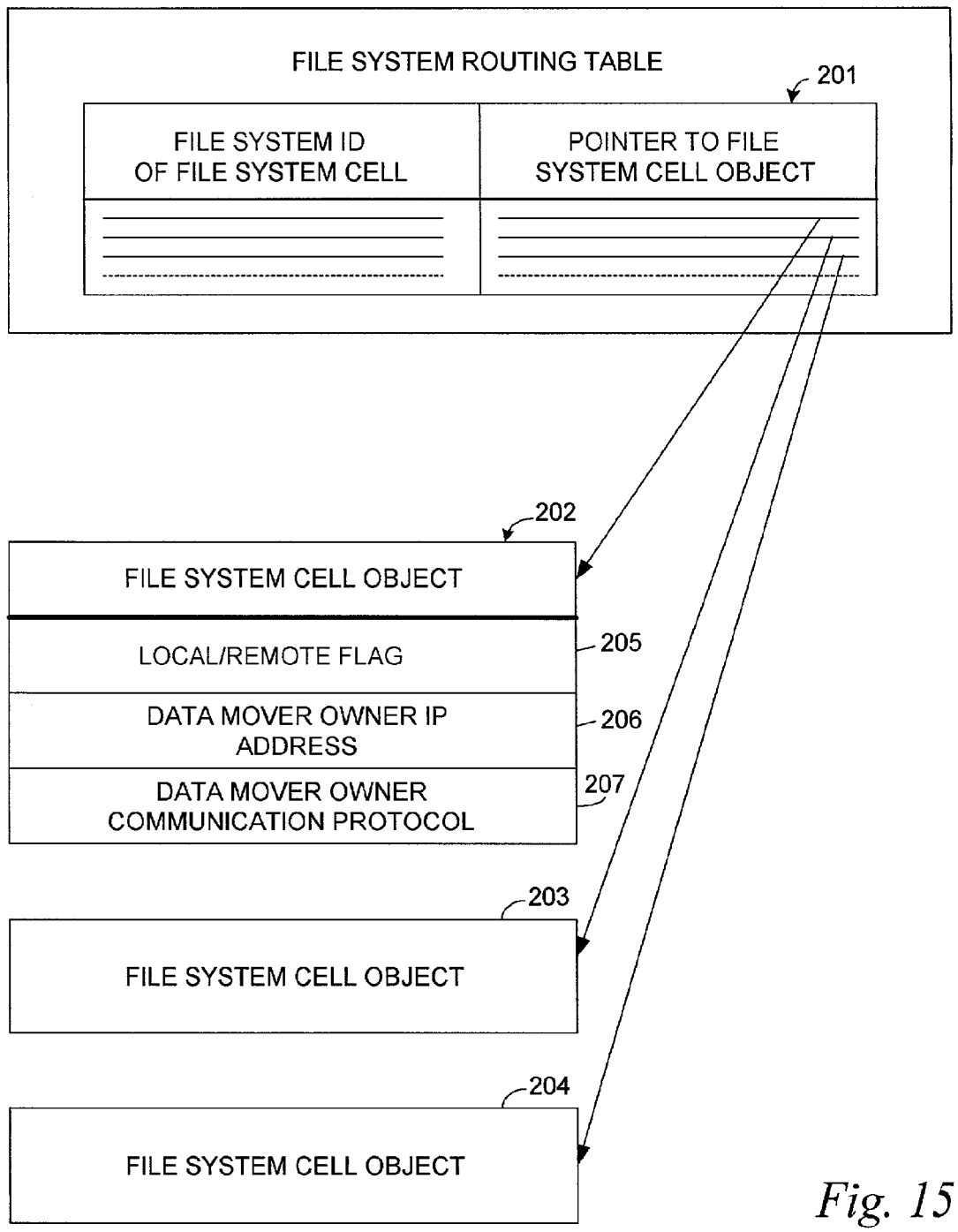
FIG. 15 shows an alternative arrangement for the routing table, in which the routing table includes pointers to file system cell objects.

In step 178 of FIG. 13, the meta file system manager uses the extracted file system ID of the file system cell to access the file system routing table 178. For each file system cell, the file system routing table 178 associates the file system ID of the file system cell with a pointer to the data mover owner of the file system cell. The association can be direct as shown in FIG. 13 or it could be indirect as shown in FIG. 15, which is further described below. By accessing the file system routing table 178 with the extracted file system cell ID, the meta file system manager obtains the pointer to the associated data mover owner of the file system cell. Then, in step 179, using information from accessing the file system routing table, the meta file system manager determines whether or not the data mover owner of the file system cell is the data mover currently processing the client request; i.e., whether or not the local data mover is the owner of the file system cell. If the local data mover is the owner of the file system cell, then execution branches to step 180 to access the object through the local UxFS. Otherwise, if the data mover owner of the file system is remote, then execution continues to step 181 to use MPFS to access the object by obtaining a lock and metadata from the data mover owner, and then directly accessing the object in storage.

From FIG. 13, it is seen that by including the file ID 172 of the file system cell in the file handle 172 sent to and received from the network client, it is very easy for the file system manager to access a file system routing table to direct a file system access request from a client to the data mover owner of the object to be accessed. Because the file system routing table 148 need only include one entry for each file system cell in the meta file system, it is relatively compact and is easily replicated in each of the data movers.

Although the flow chart in FIG. 13 has been described with reference to accessing an object in response to a client providing a file handle including a file system ID of a file system cell including the object, the procedure of FIG. 13 is also applicable to a directory lookup request in which the file handle is for the directory but the information sought in the directory is found in another file system cell that may be referenced in the directory. The management of this situation is shown in FIG. 14.

Figure 14:
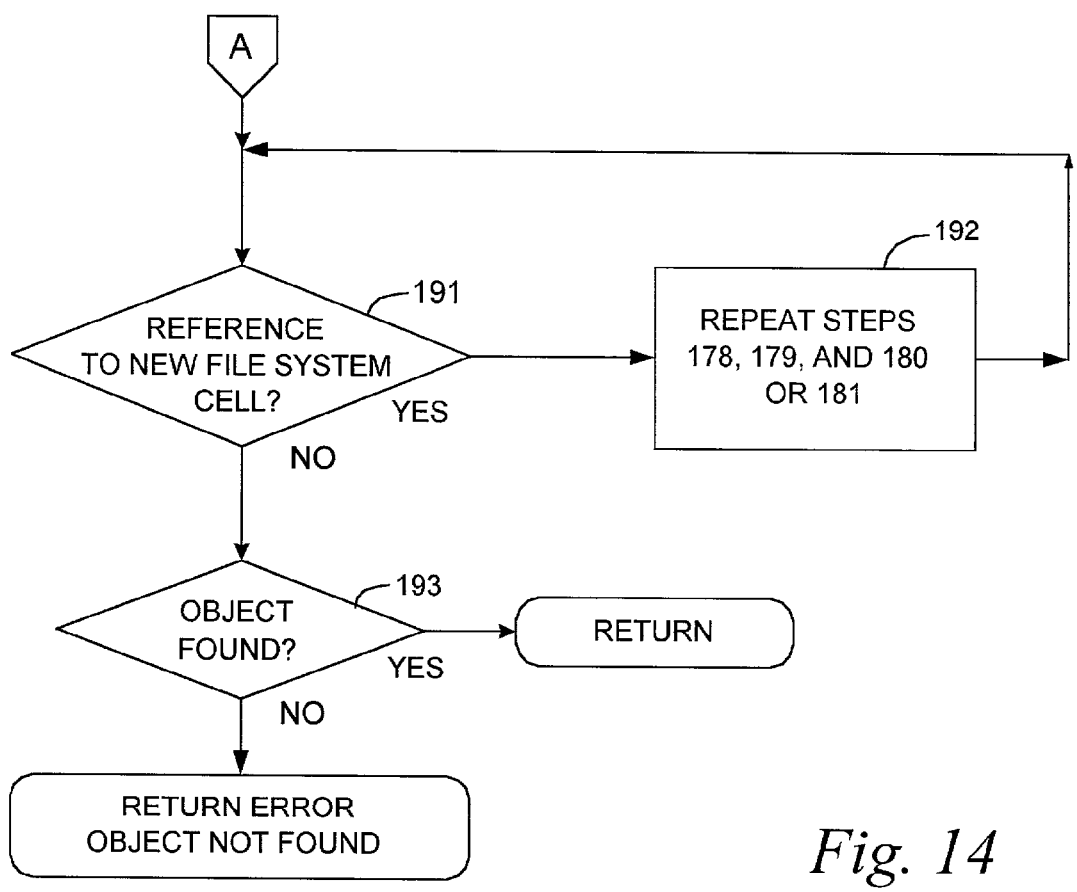
FIG. 14 is a flow chart showing how the procedure of FIG. 13 can be used to resolve hidden references to file system cells during processing of a file access request.

In step 191 of FIG. 14, execution branches to step 192 if access to the object in step 180 or step 182 encounters a reference to another file system cell. For example, a directory lookup may encounter a hidden link specifying another file system cell. In this case, in step 192, steps 178, 179, and 180 or 181 are repeated to extend the directory lookup into the file system cell specified by the hidden link. When there is no further references to additional file system cells, execution continues from step 191 to 193. In step 192, if the object sought has been found, execution returns normally. Otherwise, if the object sought cannot be found, then execution returns with an error code indicating that the object has not been found.

FIG. 15 shows an alternative construction for a file system routing table 201. In this example, the routing table associates each file system cell ID with a respective pointer to a file system cell object 202, 203, 204, etc. Each file system cell object, such as the object 202, includes a local/remote flag 205 indicating whether or not the local data mover owns the file system cell, a data mover owner IP address pointing to the data mover that owns the file system cell, and an identifier 207 of a communication protocol for communicating with the data mover that owns the file system cell.

In view of the above, file system cells are linked together to form a meta file system that appears to a user or application program to be a single file system. Each file system cell may have a conventional file system format, and can be indistinguishable from a conventional file system except for information, such as directory entry attributes, indicating one or more external links to other file system cells. These external links may include direct links that are hidden from the user or application program and define a hierarchy of the meta file system cells, and indirect links that appear in the user-visible file system. Preferably the indirect links include a target specification that is the name of a path in the user-visible file system so that the target does not change during any re-organization of the meta file system. The meta file system substantially reduces crash recovery time because each file system cell functions as a consistency unit that can be repaired only if needed. The meta file system also permits the file system cells to be accessed concurrently by multiple processors in a file server. Each processor can be assigned exclusive management of a set of file system cells. As objects such as files are added to the file system cells, each processor can monitor loading upon its file system cells, and respond to a high loading condition by polling the other processors to find a less heavily loaded processor. If a less heavily loaded processor is found, the meta file system can be reorganized to perform load balancing by shifting the load from the more heavily loaded processor to the less heavily loaded processor. In order to determine easily which processor is assigned to manage access to a file, the file handle used in a network file access protocol includes an identifier of the file system cell and a pointer to the file in the file system cell. A routing table in each processor associates each file system cell identifier with a pointer to the processor assigned to access the file.

What is claimed is:

1. In a data network, a method of accessing an object in a meta file system stored in a network file server, the meta file system including a plurality of file system cells, the method comprising:

a network client sending a directory lookup request for the object to the network file server;

the network file server receiving the directory lookup request, and in response, performing a directory lookup for the object, and returning to the network client a file handle for the object, the file handle including an identifier of a file system cell including the object, and a pointer to the object in the file system cell;

the network client receiving the file handle for the object, sending to the network file server a request for access to the object, the request for access to the object including the file handle for the object; and the network file server receiving the request for access to the object, and in response, the network file server extracting the file system cell identifier and the object pointer from the file handle included in the request for access, using the file system cell identifier to find the file system cell that includes the object, and using the object pointer to find the object in the file system cell, wherein the network file server includes a plurality of processors, and each of the file system cells has a respective one of the processors that is assigned exclusive management of metadata of said each of the file system cells, and wherein the network file server responds to the file access request by accessing a routing table with the extracted identifier of the file system cell in order to obtain a pointer to the respective one of the processors that is assigned exclusive management of metadata of the file system cell including the object, and using the pointer to the respective one of the processors to send a request to the respective one of the processors for management of metadata of the file system cell for accessing the object.

2. The method as claimed in claim 1, which includes the network file server finding a reference to another one of the file system cells during the accessing of the object after using the pointer to the respective one of the processors, and accessing the routing table to find a pointer to the respective one of the processors that is assigned exclusive management of metadata of said another one of the file system cells, and using the pointer to the respective one of the processors that is assigned exclusive management of metadata of said another one of the file system cells to send a request to the respective one of the processor that is assigned exclusive management of metadata of said another one of the file system cells for access to metadata of said another one of the file system cells.

3. The method as claimed in claim 1, wherein the routing table includes a plurality of entries, and each entry includes a respective file system identifier of a file system cell in the meta file system, and an associated pointer to the respective one of the processors assigned exclusive management of the metadata of the file system cell identified by said respective file system identifier of a file system cell in the meta file system, and the method includes the network file server accessing the entry of the routing table containing the file system identifier of the file system cell including the object in order to obtain the associated pointer to the respective one of the processors assigned exclusive management of the metadata of the file system cell including the object.

4. The method as claimed in claim 1, wherein the routing table includes a plurality of entries, and each entry includes a respective file system identifier of a file system cell in the meta file system, and an associated pointer to a file system cell object containing a pointer to the respective one of the processors assigned exclusive management of the metadata of the file system cell identified by said respective file system identifier of a file system cell in the meta file system, and the method includes the network file server accessing the entry of the routing table containing the file system identifier of the file system cell including the object in order to obtain the associated pointer to the respective file system cell object containing the pointer to the respective one of the processors assigned exclusive management of the metadata of the file system cell including the object.

5. A method of accessing an object in a meta file system stored in a network file server, the network file server including a cached disk array and a plurality of data mover computers for moving data between the cached disk array and a data network, the meta file system including a plurality of file system cells, each of the file system cells having a respective one of the data mover computers assigned exclusive management of metadata of said each of the file system cells, said method comprising:
    storing a routing table in each of the plurality of data mover computers, each of the plurality of routing tables including an entry for each file system cell, each entry including a respective file system cell identifier and associating the respective file system cell identifier with a pointer to the respective one of the data mover computers assigned exclusive management of metadata of the file system cell identified by said respective file system cell identifier;
    in response to the network file server receiving a request from the network for a file handle for a file, the network file server producing a file handle for the file, the file handle containing a file identifier obtained from the file system cell and a file system identifier for the file system cell containing the file; and
    at least one of the data mover computers receiving a subsequent request from the network for access to the file, the request for access to the file including the file handle, said at least one of the data movers responding to the request for access to the file by accessing the routing table to obtain the pointer to the respective one of the data movers assigned exclusive management of metadata of the file system cell containing the file in order to obtain management of metadata of the file system cell containing the file in order to access to the file.

6. The method as claimed in claim 5, wherein the step of producing the file handle includes interpreting a meta file system path specification associated with the file.

7. The method as claimed in claim 5, wherein each entry of the routing table includes a respective pointer to a respective file system cell object containing information associated with the file system cell identified by said respective file system cell identifier in said each entry, the information associated with the file system cell including a pointer to the data mover assigned exclusive management of metadata of the file system identified by said respective file system cell identifier in said each entry.

8. The method as claimed in claim 7, wherein the respective file system cell object includes a local/remote flag indicating whether or not said at least one of the data mover computers is assigned exclusive management of metadata of the file system identified by said respective file system cell identifier in said each entry.

9. The method as claimed in claim 7, wherein the respective file system cell object includes a specification of a communication protocol to be used by said at least one of the data mover computers for communicating with the data mover assigned exclusive management of metadata of the file system identified by said respective file system cell identifier in said each entry.

10. A network file server comprising data storage for storing a meta file system, the meta file system including a plurality of file system cells, and the network file server having at least one network port coupled to the data storage for providing network clients with access to the meta file system in the data storage, wherein the network file server is programmed for:
    receiving, from a network client, a directory lookup request for an object in the meta file system, and in response, performing a directory lookup for the object, and returning to the network client a file handle for the object, the file handle including an identifier of a file system cell including the object, and a pointer to the object in the file system cell; and
    receiving, from the network client, a request for access to the object, the request for access to the object including the file handle for the object, and in response to receipt of the request for access to the object, extracting the file system cell identifier and the object pointer from the file handle included in the request for access, using the file system cell identifier to find the file system cell that includes the object, and using the object pointer to find the object in the file system cell,
    wherein the network file server includes a plurality of processors, and each of the file system cells has a respective one of the processors that is assigned exclusive management of metadata of said each of the file system cells, and wherein the network file server is programmed for responding to the file access request by accessing a routing table with the extracted identifier of the file system cell in order to obtain a pointer to the respective one of the processors that is assigned exclusive management of metadata of the file system cell including the object, and using the pointer to the respective one of the processors to send a request to the respective one of the processors for management of metadata of the file system cell for accessing the object.

11. The network file server as claimed in claim 10, wherein the network file server is programmed for finding a reference to another one of the file system cells during the accessing of the object after using the pointer to the respective one of the processors, and accessing the routing table to find a pointer to the respective one of the processors that is assigned exclusive management of metadata of said another one of the file system cells, and using the pointer to the respective one of the processors that is assigned exclusive management of metadata of said another one of the file system cells to send a request to the respective one of the processor that is assigned exclusive management of metadata of said another one of the file system cells for access to metadata of said another one of the file system cells.

12. The network file server as claimed in claim 10, wherein the routing table includes a plurality of entries, and each entry includes a respective file system identifier of a file system cell in the meta file system, and an associated pointer to the respective one of the processors assigned exclusive management of the metadata of the file system cell identified by said respective file system identifier of a file system cell in the meta file system.

13. The network file server as claimed in claim 10, wherein the routing table includes a plurality of entries, and each entry includes a respective file system identifier of a file system cell in the meta file system, and an associated pointer to a file system cell object containing a pointer to the respective one of the processors assigned exclusive management of the metadata of the file system cell identified by said respective file system identifier of a file system cell in the meta file system.

14. A network file server including a cached disk array and a plurality of data mover computers for moving data between a data network and a meta file system stored in the cached disk array, the meta file system including a plurality of file system cells, each of the file system cells having a respective one of the data mover computers assigned exclusive management of metadata of said each of the file system cells;

said network file server being programmed for storing a routing table in each of the data mover computers, the routing table in each of the data mover computers including an entry for each file system cell, each entry including a respective file system cell identifier and associating the respective file system cell identifier with a pointer to the respective one of the data mover computers assigned exclusive management of metadata of the file system cell identified by said respective file system cell identifier;

said network file server being programmed for responding to receipt of a request from the network for a file handle for a file by producing a file handle for the file, the file handle containing a file identifier obtained from the file system cell and a file system identifier for the file system cell containing the file; and at least one of the data mover computers being programmed for receiving a subsequent request from the network for access to the file, the request for access to the file including the file handle, said at least one of the data movers being further programmed for responding to the request for access to the file by accessing the routing table in said at least one of the data mover computers to obtain the pointer to the respective one of the data movers assigned exclusive management of metadata of the file system cell containing the file in order to obtain management of metadata of the file system cell containing the file in order to access to the file.

15. The network file server as claimed in claim 14, wherein the network file server is programmed for interpreting a meta file system path specification associated with the file in order to produce the file handle for the file.

16. The network file server as claimed in claim 14, wherein each entry of the routing table in said at least one of the data mover computers includes a respective pointer to a respective file system cell object containing information associated with the file system cell identified by said respective file system cell identifier in said each entry, the information associated with the file system cell including a pointer to the data mover assigned exclusive management of metadata of the file system identified by said respective file system cell identifier in said each entry.

17. The network file server as claimed in claim 16, wherein the respective file system cell object includes a local/remote flag indicating whether or not said at least one of the data mover computers is assigned exclusive management of metadata of the file system identified by said respective file system cell identifier in said each entry.

18. The network file server as claimed in claim 16, wherein the respective file system cell object includes a specification of a communication protocol to be used by said at least one of the data mover computers for communicating with the data mover assigned exclusive management of metadata of the file system identified by said respective file system cell identifier in said each entry.

* * * * *